US011825223B2

(12) United States Patent
Miyake

(10) Patent No.: US 11,825,223 B2
(45) Date of Patent: Nov. 21, 2023

(54) IMAGING DEVICE AND DRIVING METHOD THEREOF

(71) Applicant: Panasonic Intellectual Property Management Co., Ltd., Osaka (JP)

(72) Inventor: Yasuo Miyake, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 51 days.

(21) Appl. No.: 17/543,830

(22) Filed: Dec. 7, 2021

(65) Prior Publication Data

US 2022/0094869 A1 Mar. 24, 2022

Related U.S. Application Data

(63) Continuation of application No. PCT/JP2020/024748, filed on Jun. 24, 2020.

(30) Foreign Application Priority Data

Aug. 1, 2019 (JP) .................................. 2019-142101

(51) Int. Cl.
*H04N 25/65* (2023.01)
*H04N 25/75* (2023.01)
(Continued)

(52) U.S. Cl.
CPC ........... *H04N 25/65* (2023.01); *H04N 25/745* (2023.01); *H04N 25/75* (2023.01); *H04N 25/772* (2023.01)

(58) Field of Classification Search
CPC ...... H04N 25/65; H04N 25/745; H04N 25/75; H04N 25/772; H04N 25/76; H04N 25/616; H04N 25/70
See application file for complete search history.

(56) References Cited

U.S. PATENT DOCUMENTS 8,089,522 B2 * 1/2012 Choi .................... H04N 25/443
348/222.1
9,124,834 B2 * 9/2015 Okura .................. H04N 25/767
(Continued)

FOREIGN PATENT DOCUMENTS

JP  2001-016503   1/2001
JP  2001-358992   12/2001
(Continued)

OTHER PUBLICATIONS

International Search Report of PCT application No. PCT/JP2020/024748 dated Sep. 15, 2020.

*Primary Examiner* — Nhan T Tran
(74) *Attorney, Agent, or Firm* — McDermott Will & Emery LLP

(57) ABSTRACT

An imaging device includes multiple pixels, a first analog-to-digital (AD) converter and a second AD converter that receive analog signals read from the pixels and output digital signals the analog signals, a first frame memory, and an image processor. The analog signals include a reset signal representing a reset level and a pixel signal representing an image of a subject. The first frame memory temporarily stores a first digital signal that is one of the digital signals, corresponding to the reset signal, output from the first AD converter and the second AD converter. The image processor outputs a difference between the first digital signal stored on the first frame memory and a second digital signal that is another one of the digital signals, corresponding to the pixel signal on pixels from which the reset signal is read, output from the first AD converter and the second AD converter.

12 Claims, 23 Drawing Sheets

(51) Int. Cl.
H04N 25/71 (2023.01)
H04N 25/772 (2023.01)

(56) References Cited

U.S. PATENT DOCUMENTS

| | | | |
|---|---|---|---|
| 2005/0046715 A1* | 3/2005 | Lim | H04N 25/65 |
| | | | 358/463 |
| 2008/0018760 A1 | 1/2008 | Nakajima | |
| 2009/0273694 A1* | 11/2009 | Krymski | H04N 25/75 |
| | | | 348/308 |
| 2011/0241151 A1 | 10/2011 | Nakatani et al. | |
| 2013/0087683 A1* | 4/2013 | Mo | H04N 25/75 |
| | | | 250/208.1 |
| 2014/0375852 A1* | 12/2014 | Ogino | H04N 23/672 |
| | | | 438/69 |
| 2018/0070034 A1* | 3/2018 | Kimura | H04N 25/617 |
| 2019/0006412 A1 | 1/2019 | Ando et al. | |
| 2020/0389617 A1 | 12/2020 | Totsuka | |

FOREIGN PATENT DOCUMENTS

| | | | | |
|---|---|---|---|---|
| JP | 2008-028517 | | 2/2008 | |
| JP | 2009-141673 | | 6/2009 | |
| JP | 2010-232804 | | 10/2010 | |
| JP | 2010232804 A | * | 10/2010 | H04N 5/335 |
| JP | 2011-228648 | | 11/2011 | |
| JP | 2016-012903 | | 1/2016 | |
| JP | 2017-126846 | | 7/2017 | |
| JP | 2020-202480 | | 12/2020 | |

* cited by examiner

_US 11,825,223 B2_

IMAGING DEVICE AND DRIVING METHOD THEREOF

BACKGROUND

1. Technical Field

The present disclosure relates to an imaging device and a driving method thereof.

2. Description of the Related Art

Japanese Unexamined Patent Application Publication No. 2011-228648 discloses an imaging device having an organic photoelectric converting layer supported by a semiconductor substrate with an insulation layer arranged therebetween. As disclosed in Japanese Unexamined Patent Application Publication No. 2011-228648, a structure including not an embedded photo-diode but a photoelectric converter having multiple pixel electrodes above a semiconductor substrate is sometimes referred to as a laminated type. In such a structure, the semiconductor substrate supporting the photoelectric converter includes multiple reading circuits corresponding to multiple pixels, each pixel having pixel electrodes. As illustrated in FIG. 1 of Japanese Unexamined Patent Application Publication No. 2011-228648, the pixel electrode in each pixel is connected to a corresponding one of reading circuits through a via disposed in an insulation layer.

In the field of imaging devices, there is a demand for noise reduction. In particular, there is a high demand for reducing kTC noise created in the resetting of charges generated through photoelectric conversion. The kTC noise is also referred to "reset noise."

Japanese Unexamined Patent Application Publication No. 2008-028517 discloses an imaging device that includes a transistor serving as a transfer unit between a photoelectric converter generating signal charges and a memory storing the signal charges. The imaging device disclosed in Japanese Unexamined Patent Application Publication No. 2008-028517 further includes a noise suppressor including a frame memory and an adder. According to the technique disclosed in Japanese Unexamined Patent Application Publication No. 2008-028517, the effect of shot noise created by dark current created in the memory in each pixel is canceled by subtracting a reset level stored on the frame memory from a signal level through digital processing.

SUMMARY

Though in the imaging device disclosed in Japanese Unexamined Patent Application Publication No. 2008-028517, reading of the reset signal representing the reset level is performed in parallel with exposure of the photoelectric converter, transfer of the signal charges to the memory via the transfer unit is to be performed after the completion of the reading of the reset signals from all rows. For this reason, the reading of pixel signals representing the image of a subject is performed after the completion of the reading of the reset signals from all the rows. Specifically, a time interval between the reading of the reset signal and the reading of the pixel signal along each row of the pixels is difficult to be shortened and thus an increase of frame rates is also difficult.

One non-limiting and exemplary embodiment provides an imaging device as described below.

In one general aspect, the techniques disclosed here feature the imaging device including: multiple pixels arranged at multiple rows and columns; a first analog-to-digital (AD) converter and a second AD converter that receive analog signals read from the pixels and output digital signals responsive to the analog signals; multiple line sets that transfer the analog signals, each line set including a first output signal line and a second output signal line and arranged for each of the columns; a first frame memory; and an image processor. The analog signals include a reset signal representing a reset level and a pixel signal representing an image of a subject. The first frame memory temporarily stores a first digital signal that is one of the digital signals, corresponding to the reset signal, output from the first AD converter and the second AD converter. The image processor outputs a difference between the first digital signal stored on the first frame memory and a second digital signal that is the other of the digital signals, corresponding to the pixel signal on pixels from which the reset signal is read, output from the first AD converter and the second AD converter.

It should be noted that general or specific embodiments may be implemented as a system, a method, a device, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

Embodiments of the disclosure may provide an imaging device that improves a frame rate while canceling the effect of reset noise.

DETAILED DESCRIPTION

Figure 1:
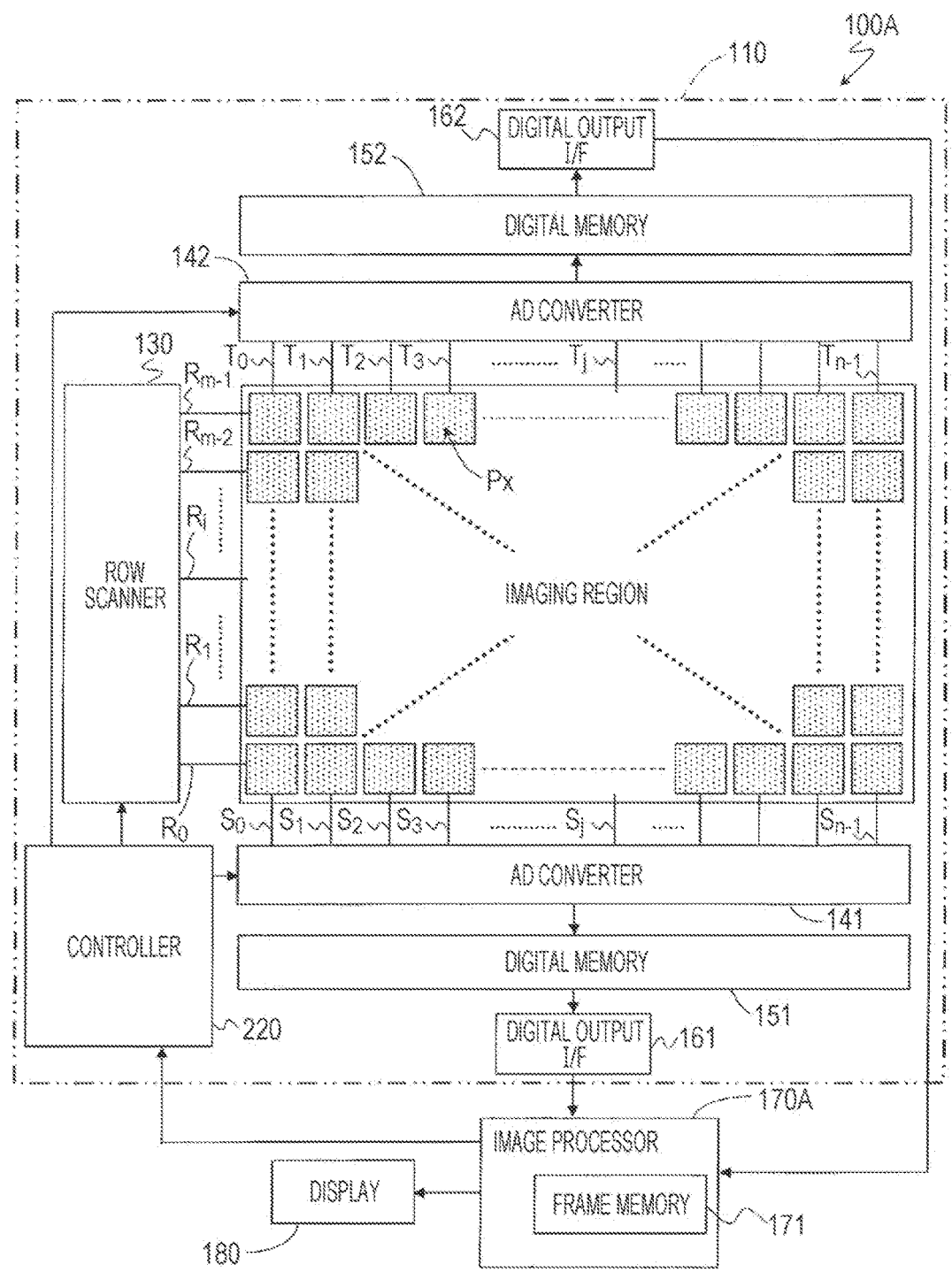
FIG. 1 schematically illustrates an exemplary configuration of an imaging device of a first embodiment of the disclosure.

Aspect of the disclosures are described below.

First Aspect

According to a first aspect of the disclosure, there is a provided an imaging device including: multiple pixels arranged at multiple rows and columns;

a first analog-to-digital (AD) converter and a second AD converter that receive analog signals read from the pixels and output digital signals responsive to the analog signals;

multiple line sets that transfer the analog signals, each line set including a first output signal line and a second output signal line and arranged for each of the columns;

a first frame memory;

and an image processor.

The analog signals include a reset signal representing a reset level and a pixel signal representing an image of a subject.

The first frame memory temporarily stores a first digital signal that is one of the digital signals, corresponding to the reset signal, output from the first AD converter and the second AD converter.

The image processor outputs a difference between the first digital signal stored on the first frame memory and a second digital signal that is the other of the digital signals, corresponding to the pixel signal on pixels from which the reset signal is read, output from the first AD converter and the second AD converter.

According to the first aspect, the imaging device includes the first AD converter and second AD converter. Out of the outputs from the first AD converter and second AD converter, the first digital signal responsive to the reset signal is stored on the first frame memory and a difference between the first digital signal and the second digital signal corresponding to the pixel signal is calculated. The effect of reset noise may thus be practically canceled. Since the imaging device includes the first AD converter and second AD converter, a portion of a read time of the reset signal may partially overlap a portion of a read time of the pixel signal. The length of an exposure time may be flexibly modified.

Second Aspect

In the imaging device according to a second aspect in view of the first aspect, the first AD converter may receive the reset signal out of the analog signals read from the pixels and convert the reset signal into the first digital signal, and the second AD converter may receive the pixel signal out of the analog signals read form the pixels and convert the pixel signal into the second digital signal.

Third Aspect

In the imaging device according to a third aspect in view of the second aspect, the first output signal line may be connected to the first AD converter, and the second output signal line may be connected to the second AD converter.

The imaging device may further include multiple first signal switches, each of the first signal switch connected between each of the pixel and a corresponding line set of the first output signal line and the second output signal line.

The first signal switch may output the reset signal out of the analog signals read from the pixels to the first output signal line and the pixel signal out of the analog signals read from the pixels to the second output signal line.

Fourth Aspect

In the imaging device according to a fourth aspect in view of the second aspect, the pixels may include a first pixel and a second pixel arranged at different rows.

The first pixel may be connected to the first output signal line and the second pixel may be connected to the second output signal line.

The imaging device may further include a first signal switch connected between each of the first output signal line and the second output signal line and the first AD converter and a second signal switch connected between each of the first output signal line and the second output signal line and the second AD converter.

The first signal switch and the second signal switch may operate mutually complementarily.

Fifth Aspect

In the imaging device according to a fifth aspect in view of the second aspect, an output timing of the first digital signal output from the first AD converter may match an output timing of the second digital signal output from the second AD converter.

Sixth Aspect

In the imaging device according to a sixth aspect in view of the first aspect, the pixels may include a first pixel and a second pixel arranged at different rows.

The first pixel may be connected to the first AD converter via the first output signal line and the second pixel may be connected to the second AD converter via the second output signal line.

The first AD converter may generate a digital signal responsive to an analog signal read from the first pixel, and the second AD converter may generate a digital signal responsive to an analog signal read from the second pixel.

Seventh Aspect

In the imaging device according to a seventh aspect in view of the fourth aspect, an output timing of the first digital signal output from the first AD converter may match an output timing of the second digital signal output from the second AD converter.

Eighth Aspect

In the imaging device according to an eighth aspect in view of the fourth aspect, the first pixel and the second pixel may be respectively arranged at each of even rows and each of odd rows.

Ninth Aspect

The imaging device according to a ninth aspect in view of the first aspect may further include a second frame memory that temporarily stores the second digital signal, and the image processor may output a difference between the first digital signal stored on the first frame memory and the second digital signal stored on the second frame memory.

According to the ninth aspect of the disclosure, the difference between the digital signal responsive to the pixel signal acquired during a next frame duration and the second digital signal stored on the second frame memory may be acquired. While a portion of the reset signal read time overlaps a portion of the pixel signal read time, the difference between the first digital signal and the second digital signal is calculated after the reset signal reading and the pixel signal reading are completed from all the rows of the pixels.

Tenth Aspect

The imaging device according to a tenth aspect in view of the ninth aspect may further include a third signal switch electrically connected between the first and second AD converters and the first and second frame memories.

In response to inputs, the third signal switch may selectively output the first digital signal to the first frame memory and the second digital signal to the second frame memory.

According to the tenth aspect, the first digital signal output from the corresponding AD converter may be stored on the first frame memory and the second digital signal output from the corresponding AD converter may be stored on the second frame memory.

Eleventh Aspect

In the imaging device according to an eleventh aspect in view of the first aspect, each of the pixels may include a semiconductor substrate having a reading circuit electrically connected to one or both of the first AD converter and the second AD converter and a photoelectric converter located on or above the semiconductor substrate.

Twelfth Aspect

According to a twelfth aspect of the disclosure, there is provided a driving method of an imaging device with multiple pixels, each pixel having a photoelectric converter that is supported by a semiconductor substrate having an impurity region and is electrically connected to a charge accumulation region having the impurity region as a portion of the charge accumulation region. The driving method includes:

resetting a potential of the charge accumulation region;

reading a reset signal responsive to the potential of the charge accumulation region after the resetting;

generating a first digital signal responsive to the reset signal via AD conversion;

storing the first digital signal on a first frame memory;

accumulating, in the charge accumulation region, signal charges generated by the photoelectric converter after the resetting;

reading a pixel signal responsive to an amount of charge accumulated in the charge accumulation region in the accumulating;

generating a second digital signal responsive to the pixel signal via AD conversion; and acquiring a difference between the first digital signal and the second digital signal, wherein a duration of reading of the reset signal of a first pixel of the pixels overlaps at least partially a duration of reading the pixel signal of a second pixel different from the first pixel out of the pixels.

According to the twelfth aspect, the second digital signal responsive to the pixel signal and the first digital signal responsive to the reset signal are acquired and the difference therebetween is acquired. The effect of random noise attributed to the resetting carried out immediately prior to the exposure time may be practically canceled.

Thirteenth Aspect

According to a thirteenth aspect of the disclosure, there is provided an imaging device including:

multiple pixels arranged at multiple rows and columns;

a first analog-to-digital (AD) converter and a second AD converter;

a first frame memory; and an image processor.

The pixels include a first pixel and a second pixel arranged at different rows at the same column.

The first AD converter generates a digital signal responsive to an analog signal read from the first pixel.

The second AD converter generates a digital signal responsive to an analog signal read from the second pixel.

The analog signals include a reset signal representing a reset level and a pixel signal representing an image of a subject.

The first frame memory temporarily stores a first digital signal that is one of the digital signals, corresponding to the reset signal, output from the first AD converter and the second AD converter.

The image processor outputs a difference between the first digital signal stored on the first frame memory and a second digital signal that is other of the digital signals, corresponding to the pixel signal on a pixel from which the reset signal is read, output from the first AD converter and the second AD converter.

Fourteenth Aspect

According to a fourteenth aspect of the disclosure, there is provided an imaging device including: multiple pixels that are arranged at multiple rows and columns and include a first pixel and a second pixel arranged at different rows;

output signal lines that are electrically connected to the first pixel and the second pixel;

an AD converter that is electrically connected to the output signal lines and output digital signals responsive to analog signals read from the first pixel and the second pixel;

a first frame memory that temporarily stores a first digital signal responsive to a reset signal representing a reset level out of the output digital signals from the AD converter;

an image processor that outputs a difference between the first digital signal stored on the first frame memory and a second digital signal that is responsive to a pixel signal representing an image of a subject and is related to a pixel from which the reset signal is read out of the output digital signals from the AD converter; and a frequency multiplier that receives a horizontal synchronization signal from the image processor and generates a pulse signal having a period shorter than the period of the horizontal synchronization signal.

In response to an output from the frequency multiplier, the first pixel outputs to an output signal line the reset signal during a portion of a 1 H period.

In response to the output from the frequency multiplier, the second pixel outputs to an output signal line the pixel signal during another portion of the 1 H period.

According to the fourteenth aspect, without arranging two or more output signal lines at each column of the pixels, frame rates may be flexibly changed while the effect of reset noise is cancelled.

Fifteenth Aspect

In the imaging device according to a fifteenth aspect in view of the fourteenth aspect, the reading of the reset signal from the first pixel at a (k+1)-th frame may be performed prior to the reading of the pixel signal from the second pixel at a k-th frame wherein k is a positive integer.

Sixteenth Aspect

The image device according to a sixteenth aspect in view of one of the fourteenth and fifteenth aspects may further include a second frame memory that temporarily stores the second digital signal out of the output digital signals from the AD converter.

According to the sixteenth aspect of the disclosure, the first digital signal output from the AD converter may be stored on the first frame memory and the second digital signal from the AD converter may be stored on the second frame memory.

Embodiments of the disclosure are described with reference to the drawings. Each of the embodiments described below represents a general or specific example of the disclosure. Numerical values, shapes, materials, elements, layout positions of the elements, connection configuration, steps, and the order of the steps in the embodiments are described for exemplary purposes only and are not intended to limit the disclosure. A variety of embodiments described in this specification may be combined as long as no contradiction occurs. Elements not described in independent claims indicative of a generic concept, from among the elements of the embodiments, may be any elements. In the discussion that follows, elements having a substantially identical function are designated with the same reference numeral and the discussion thereof is not duplicated. Part of some elements may not be illustrated to avoid complications of the drawings.

First Embodiment

FIG. 1 schematically illustrates an exemplary configuration of an imaging device 100A of a first embodiment of the disclosure. The imaging device 100A illustrated in FIG. 1 includes multiple pixels Px. A portion of each of the pixels Px includes a photoelectric converter supported by a semiconductor substrate 110. As described below, the imaging device 100A has a laminated structure. As described in greater detail below, the semiconductor substrate 110 includes multiple reading circuits formed respectively for the pixels Px.

The pixels Px are two-dimensionally arranged on the semiconductor substrate 110 and thus form an imaging region. According to the first embodiment, the pixels Px are arranged at multiple rows and columns. Referring to FIG. 1, the multiple pixels Px are arranged at m rows and n columns. Each of m and n independently represents 2 or larger integer.

The imaging device 100A includes multiple row signal lines $R_i$ and multiple output signal lines. The row signal lines $R_i$ are m row signal lines $R_0$, $R_1$, $R_2$, . . . , $R_{m-2}$, $R_{m-1}$ respectively arranged for the multiple rows of the pixels Px. Each of the row signal lines $R_i$ is electrically connected to one or more pixels Px belonging to the same row. The row signal lines $R_i$ are connected to a row scanner 130. Two or more signal lines may be optionally connected to each of the rows of the pixels Px.

Referring to FIG. 1, the output signal lines include multiple first output signal lines $S_j$ and multiple second output signal lines $T_j$. The first output signal lines $S_j$ include n first output signal lines $S_0$, $S_1$, $S_2$, . . . , $S_{n-2}$, and $S_{n-1}$ respectively arranged for the columns of the pixels Px. Similarly, the second output signal lines $T_j$ includes n second output signal lines $T_0$, $T_1$, $T_2$, . . . , $T_{n-2}$, and $T_{n-1}$ respectively arranged for the columns of the pixels Px.

Each of the first output signal lines $S_j$ is electrically connected to a reading circuit of one or more pixels Px belonging to the same column. Referring to FIG. 1, the first output signal lines $S_j$ are connected to an analog-to-digital (AD) converter 141 and first digital output interface (I/F) 161. The first digital I/F 161 outputs a signal into which the first AD converter 141 has analog-to-digital (AD) converted signals read from the pixels Px via the first output signal lines $S_j$.

Similarly, each of the second output signal lines $T_j$ is electrically connected to a reading circuit of one or more pixels Px belonging to the same column. Each second output signal line $T_j$ is connected to a pixel other than the pixel connected to the first output signal line $S_j$ out of the pixels Px belonging to the same column. Alternatively, as described below, among the pixels belonging to the same column, a pixel connected to the first output signal line $S_j$ may also be connected to the second output signal line $T_j$.

Referring to FIG. 1, the second output signal lines $T_j$ are connected to the second AD converter 142 and second digital output interface (I/F) 162. The second digital I/F 162 outputs a signal into which the second AD converter 142 has AD-converted a signal read from a pixel Px via the second output signal line $T_j$. The digital output I/F may also be simply referred to as the interface.

Referring to FIG. 1, the imaging device 100A further includes a first digital memory 151 connected between the first AD converter 141 connected to the first output signal lines $S_j$ and the first digital I/F 161. The imaging device 100A further includes a second digital memory 152 connected between the second AD converter 142 connected to the second output signal lines $T_j$ and the second digital I/F 162. The first digital memory 151 or second digital memory 152 temporarily stores digital signals of one row into which the first AD converter 141 or the second AD converter 142 has AD-converted the signals read from the pixels Px. By inserting the digital memory between the AD converter and the interface, AD conversion results of the one row are stored on the digital memory while the AD converter may perform the AD conversion on the pixels of the next row. Specifically, the AD conversion may be performed on a per row basis at a higher speed.

The first digital I/F 161 and second digital I/F 162 are connected to an image processor 170A. The image processor 170A performs, as appropriate, on a digital signal output from the interface, gamma correction, color interpolation, space correction, white balance, and the like. The image processor 170A may be implemented by a digital signal processor (DSP), image signal processor (ISP), or field-programmable gate array (FPGA).

The image processor 170A is connected to a controller 220. The image processor 170A supplies the controller 220 with control signals including a vertical synchronization signal and horizontal synchronization signal. The controller 220 is connected to a row scanner 130, first AD converter 141, and second AD converter 142. The controller 220 is implemented by a micro-controller including at least one processor and typically includes a timing generator. The controller 220 supplies drive signals to the row scanner 130, first AD converter 141, and second AD converter 142 and thus controls the entire imaging device 100A. Referring to FIG. 1, an arrow mark heading to the controller 220 schematically illustrates an input signal to the controller 220 and arrow marks extending from the controller 220 schematically illustrate output signals from the controller 220. The controller 220 may include one or more memories.

The imaging device 100A may include a display 180 connected to the image processor 170A. The display 180 may be a liquid-crystal display or an organic electroluminescent (EL) display. The display 180 displays to the user of the imaging device 100A an image responsive to a digital signal acquired through photographing.

In the configuration illustrated in FIG. 1, the image processor 170A includes a first frame memory 171. The first frame memory 171 temporarily stores digital data of one frame of image output by the first digital I/F 161 and/or the second digital I/F 162. According to the first embodiment of the disclosure, the first frame memory 171 temporarily stores a first digital signal responsive to a reset signal representing a reset level. The first digital signal is output by the first AD converter 141 or the second AD converter 142 when the first AD converter 141 or the second AD converter 142 receives the reset signal as an analog signal read from each pixel Px. As described below, the image processor 170A outputs a difference between the first digital signal stored on the first frame memory 171 and a second digital signal responsive to a pixel signal representing an image of a subject. The difference between the digital signals may substantially cancel the effect of random noise attributed to the reset operation that is performed immediately prior to exposure time.

In the configuration in FIG. 1, to read signals from the pixels, the imaging device 100A includes two line groups, namely, a first line group including the first output signal lines $S_j$ and a second line group including the second output signal lines $T_j$. In one connection configuration, the first output signal line $S_j$ is connected to one or more pixels Px at a column of the pixels Px. On the other hand, the second output signal line $T_j$ is connected to one or more pixels Px other than the one or more pixels Px connected to the first output signal line $S_j$ at the same column. In this connection configuration, with respect to a column of the pixels Px, the reading of a reset signal from a pixel at a first row and the reading of a pixel signal from a pixel belonging to a row different from the first row may be performed in parallel. This may reduce a time interval between the read time of the reset signal per row and the read time of the pixel signal per row, leading to an improved frame rate while removing the effect of reset noise.

Exemplary Circuit Configuration of Pixels Px

Figure 2:
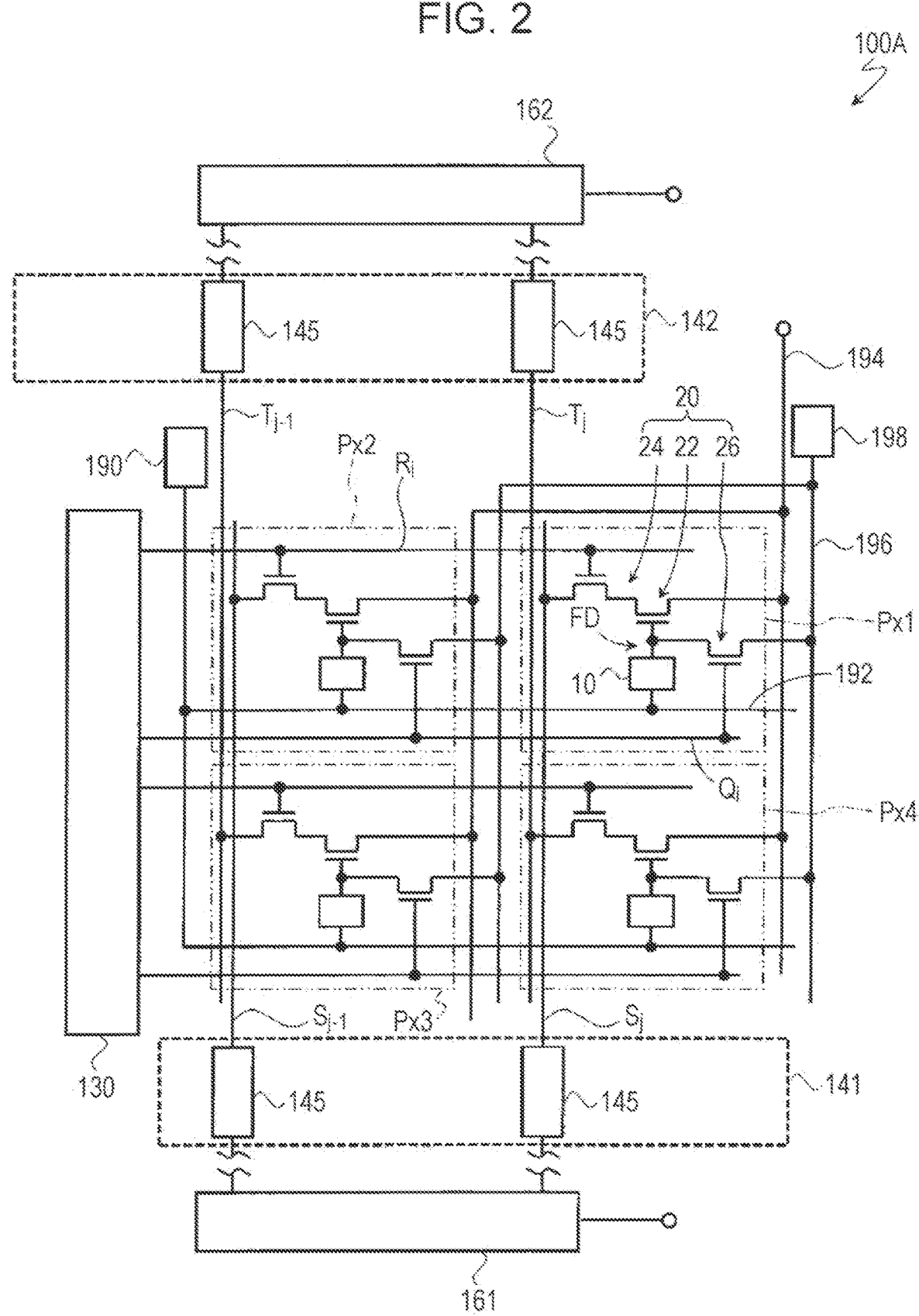
FIG. 2 is a schematic circuit diagram of the imaging device of the first embodiment of the disclosure.

FIG. 2 illustrates an exemplary circuit configuration of the imaging device 100A. For simplicity of explanation, FIG. 2 illustrates only four pixels Px included in an imaging region in FIG. 1. The four pixels are arranged at two rows and two columns and include a first pixel Px1, second pixel Px2, third pixel Px3, and fourth pixel Px4. From among the four pixels, the first pixel Px1 and second pixel Px2 are at the same row while the third pixel Px3 and fourth pixel Px4 are at another row different from the row of the first pixel Px1 and second pixel Px2. For example, the first pixel Px1 and second pixel Px2 are located at an even row of a pixel array including the pixels Px and the third pixel Px3 and fourth pixel Px4 are located at an odd row of the pixel array. The basic circuit configuration of pixel is identical to all the first pixel Px1 through the fourth pixel Px4. The circuit configuration of the first pixel Px1 is representatively described below.

The first pixel Px1 includes a photoelectric converter 10 and a reading circuit 20 electrically connected the photoelectric converter 10. As described below, the photoelectric converter 10 includes a pixel electrode, counter electrode, and photoelectric conversion layer inserted therebetween. The photoelectric converter 10 of each pixel has an electrical connection to a voltage line 192 connected to a power supply circuit 190. While the imaging device 100A is operating, the photoelectric converter 10 is configured to be supplied with a predetermined voltage between the pixel electrode and counter electrode. The power supply circuit 190 is not limited to any particular power supply circuit and is simply configured to supply the predetermined voltage to the photoelectric converter 10 of each pixel while the imaging device 100A is operating. The power supply circuit 190 may be a circuit generating the predetermined voltage or a circuit that converts into the predetermined voltage a voltage supplied from another power supply. The power supply circuit 190 may be part of the row scanner 130.

In the circuit configuration in FIG. 2, the reading circuit 20 includes a signal detecting transistor 22, address transistor 24, and reset transistor 26. The signal detecting transistor 22, address transistor 24, and reset transistor 26 are typically field-effect transistors formed in the semiconductor substrate 110. In the discussion that follows, the signal detecting transistor 22, address transistor 24, and reset transistor 26 are N-channel metal-oxide-semiconductor field-effect transistors (MOSFETs).

A gate of the signal detecting transistor 22 is connected to a pixel electrode of the photoelectric converter 10. A source of the signal detecting transistor 22 is connected to a corresponding output signal line via the address transistor 24. A combination of the first output signal line $S_j$ and the second output signal line $T_j$ is connected to every multiple columns of the pixels Px. Referring to FIG. 2, the first output signal lines $S_j$ are connected to the first AD converter 141. In contrast, the second output signal lines $T_j$ are connected to the second AD converter 142.

The first pixel Px1 and fourth pixel Px4 belonging to the same column of the pixel array in FIG. 2 may now be considered. The source of the signal detecting transistor 22 of the first pixel Px1 is electrically connected to the first output signal line $S_j$. On the other hand, the source of the signal detecting transistor 22 of the fourth pixel Px4 is electrically connected to the second output signal line $T_j$. Similarly, the second pixel Px2 and third pixel Px3 belonging to the same column may now be considered. The source of the signal detecting transistor 22 of the second pixel Px2 is electrically connected to the first output signal line $S_{j-1}$ and the source of the signal detecting transistor 22 of the third pixel Px3 is electrically connected to the second output signal line $T_{j-1}$. As described above, the first AD converter 141 performs AD conversion to generate digital signals responsive to analog signals read from the first pixel Px1 and the second pixel Px2 located at the even row of the pixel array and outputs the digital signals to the first digital I/F 161. The second AD converter 142 performs AD conversion to generate digital signals responsive to analog signal read from the third pixel Px3 and the fourth pixel Px4 located at the odd row of the pixel array and outputs the digital signals to the second digital I/F 162.

The analog signal read from each pixel includes a reset signal representing a reset level and a pixel signal representing an image of a subject. As described below, the reset signal and pixel signal read from each pixel Px include kTC noise superimposed thereon and created in resetting of each pixel Px.

As schematically illustrated in FIG. 2, each of the first AD converter 141 and the second AD converter 142 may include multiple elements arranged for each output signal line, such as column signal processors 145. Each of the elements is connected to a corresponding one of the output signal lines. On the other hand, the drain of the signal detecting transistor 22 of each pixel Px is connected to a power supply line 194. While the imaging device 100A is operating, the power supply line 194 feeds a power supply voltage VDD of about 3.3 V and thus functions as a source follower power supply.

The gate of the address transistor 24 is connected to a row signal line $R_j$. The row scanner 130 turns on or off the address transistor 24 by controlling the level of a voltage applied to the row signal line $R_j$. In this way, the row scanner 130 may read a signal at an output signal line corresponding to a pixel belonging the selected row.

The reading circuit 20 further includes the reset transistor 26. One of the drain and source of the reset transistor 26 is connected to a node FD that electrically connects the photoelectric converter 10 to the gate of the signal detecting transistor 22. The other of the drain and source of the reset transistor 26 is connected to a reset voltage line 196. The reset voltage line 196 is connected to a reset voltage supply circuit 198. While the imaging device 100A is operating, a predetermined reset voltage $V_{RST}$ is applied from the reset voltage supply circuit 198 to the reset voltage line 196. The reset voltage $V_{RST}$ is at or close to 0 V. The reset voltage supply circuit 198 is simply configured to be able to apply a predetermined reset voltage to each pixel Px while the imaging device 100A is operating. As with the case of the power supply circuit 190, the reset voltage supply circuit 198 is not limited to any particular power supply circuit. The reset voltage supply circuit 198 may be a circuit independent of the power supply circuit 190, or one of the reset voltage supply circuit 198 and power supply circuit 190 may be part of the other of the reset voltage supply circuit 198 and power supply circuit 190.

Multiple reset signal lines $Q_i$ are arranged for multiple pixels Px. Typically, as illustrated in FIG. 2, a single reset signal line is commonly connected to the gates of the reset transistors 26 of the pixels Px at the same row. In this example, the reset signal line $Q_i$ has a connection with the row scanner 130. The row scanner 130 turns on the reset transistors 26 on a per row basis of the pixels Px by controlling the level of the voltage applied to the reset signal line $Q_i$ and thus resets the potential at the node FD of the pixel Px of the turned on reset transistor 26 to the reset voltage $V_{RST}$.

Device Structure of Pixel Px

Figure 3:
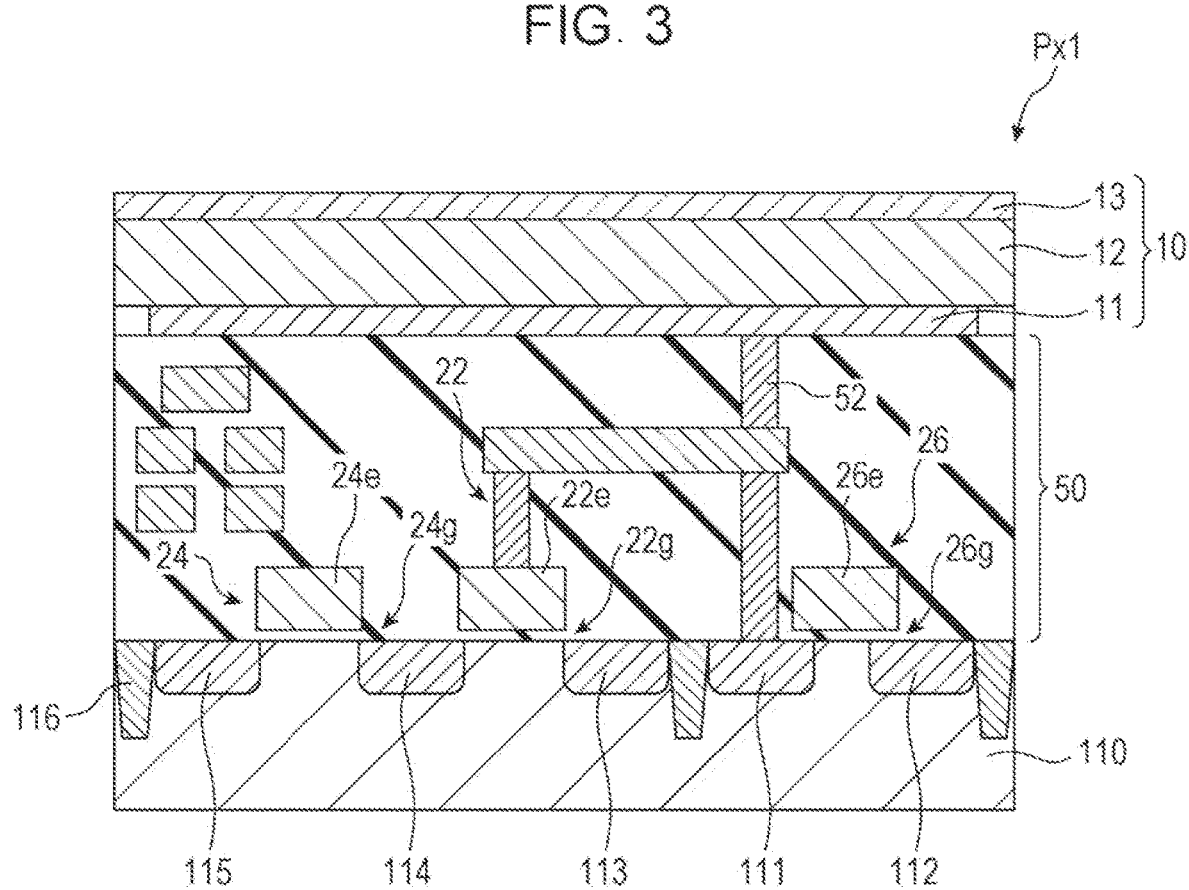
FIG. 3 is a schematic sectional view illustrating an exemplary device structure of a first pixel Px1.

FIG. 3 illustrates the device structure of the first pixel Px1. The first pixel Px1 includes the semiconductor substrate 110 having the reading circuit 20 formed therewithin and the photoelectric converter 10 supported by the semiconductor substrate 110. Typically, referring to FIG. 3, an insulation layer 50 covering the reading circuit 20 is inserted between the semiconductor substrate 110 and the photoelectric converter 10.

The photoelectric converter 10 includes a pixel electrode 11 supported by the insulation layer 50, light-transmissive counter electrode 13, and photoelectric conversion layer 12 located between the pixel electrode 11 and counter electrode 13. The pixel electrode 11 is located closer to the semiconductor substrate 110 than the photoelectric conversion layer 12 and is manufactured of polysilicon to which conductivity is imparted by doping a metal, such as aluminum or copper, metal nitride, or impurity. Referring to FIG. 3, the pixel electrode 11 is spaced apart from and thus electrically isolated from the pixel electrode 11 of another adjacent pixel.

The counter electrode 13 is positioned on the incident side of light from a subject to the pixel Px. The counter electrode 13 is a light-transmissive electrode that is manufactured of an electrically conductive material, such as indium tin oxide (ITO). The term "light-transmissive" signifies that the photoelectric conversion layer 12 is able to transmit at least a portion of light having a wave that is absorbable by the photoelectric conversion layer 12 but does not necessarily signify that the photoelectric conversion layer 12 is able to transmit visible light in the entire wave range. An optical filter, such as a color filter, and a micro lens are arranged on the main surface of the counter electrode 13 opposite from the photoelectric conversion layer 12.

The counter electrode 13 is a single electrode layer that strides over multiple pixels. The voltage line 192 is connected to the counter electrode 13 of the photoelectric converter 10. Referring to FIG. 2, the voltage line 192 is arranged for each of the photoelectric converters 10 of the pixels. Typically, however, the counter electrode 13 of each pixel is part of the single light-transmissive electrode connected across the multiple pixels. The counter electrode 13 of the pixels is basically equipotential and the voltage line 192 may not necessarily be branched into multiple wirings.

The photoelectric conversion layer 12 is manufactured of an organic material or an inorganic material, such as amorphous silicon and generates charge pairs in response to the entrance of light transmitted through the counter electrode 13. Like the counter electrode 13, the photoelectric conversion layer 12 is typically a single photoelectric conversion structure that continuously strides over the multiple pixels. Specifically, the photoelectric conversion layer 12 may be part of a photoelectric conversion layer continuously formed over the multiple pixels.

The photoelectric conversion layer 12 may be manufactured by selecting one or more appropriate materials as a photoelectric conversion material and thus, the photoelectric conversion layer 12 sensitive in a visible light range and an infrared light range may be obtained. Such materials are described in greater detail in International Publication No. 2018/025544. International Publication No. 2018/025544 is hereby incorporated by reference. The photoelectric conversion layer 12 may be manufactured of quantum dots and/or nanotubes. The photoelectric conversion layer 12 may include quantum dots and/or nanotubes as a photoelectric conversion material. The photoelectric conversion layer 12 may include a layer of an organic material and a layer of an inorganic material.

The insulation layer 50 located between the semiconductor substrate 110 and the photoelectric converter 10 includes multiple insulation sublayers, each manufactured of silicon dioxide. As schematically illustrated in FIG. 3, the insulation layer 50 internally includes multi-layer wirings including at least a conductive structure 52 with one end thereof connected to the pixel electrode 11 of the photoelectric converter 10. The conductive structure 52 may include a via and wiring, each manufactured of a metal, such as copper, and a plug manufactured of polysilicon. Referring to FIG. 3, the other end of the conductive structure 52 is electrically connected to an impurity region 111 formed in the semiconductor substrate 110.

The semiconductor substrate 110 includes, besides the impurity region 111, impurity regions 112, 113, 114, and 115. The semiconductor substrate 110 further includes an element isolation region 116 that electrically isolates the reading circuit 20 for one pixel Px from the reading circuit 20 for another pixel Px. In the following discussion, a P-type silicon substrate is used for the semiconductor substrate 110. The semiconductor substrate 110 may be an insulation substrate having a semiconductor layer formed thereon.

The impurity regions 111, 112, 113, 114, and 115 are typically N-type diffusion regions. Out of these impurity regions, the impurity region 111 connected to the conductive structure 52 functions as one of the source region and drain region of the reset transistor 26. The reset transistor 26 further includes the impurity region 112 functioning as the other of the source region and drain region thereof, a gate insulation layer 26g on the semiconductor substrate 110, and a gate electrode 26e on the gate insulation layer 26g. The impurity region 112 is connected to the reset voltage line 196 although the reset voltage line 196 is not illustrated in FIG. 3.

The signal detecting transistor 22 includes the impurity region 113 and impurity region 114, a gate insulation layer 22g on the semiconductor substrate 110, and a gate electrode 22e on the gate insulation layer 22g. The impurity region 113 functions as the drain region of the signal detecting transistor 22 and the impurity region 114 functions as the source region of the signal detecting transistor 22. The impurity region 113 is connected to the power supply line 194. As schematically illustrated in FIG. 3, the element isolation region 116 is also located between the signal detecting transistor 22 and the reset transistor 26.

The address transistor 24 includes the impurity region 114 and impurity region 115, a gate insulation layer 24g on the semiconductor substrate 110, and a gate electrode 24e on the gate insulation layer 24g. The impurity region 114 and impurity region 115 respectively function as the drain region and source region of the address transistor 24. As schematically illustrated in FIG. 3, the address transistor 24 shares the impurity region 114 with the signal detecting transistor 22.

A corresponding one of the first output signal lines $S_j$ and the second output signal lines $T_j$ is connected to the impurity region 115.

The insulation layer 50 covers the signal detecting transistor 22, address transistor 24, and reset transistor 26. As schematically illustrated in FIG. 3, the conductive structure 52 within the insulation layer 50 has an electrical connection with the gate electrode 22e of the signal detecting transistor 22. Specifically, the conductive structure 52 of each pixel has a function of electrically connecting the pixel electrode 11 of the photoelectric converter 10 to the reading circuit 20 including the signal detecting transistor 22 formed in the semiconductor substrate 110.

The conductive structure 52 further functions as part of a charge accumulation region that temporarily accumulates signal charges collected by the pixel electrode 11. As previously described with reference to FIG. 2, the power supply circuit 190 applies a predetermined voltage to the photoelectric converter 10 of each pixel via the voltage line 192. For example, by applying a voltage to the counter electrode 13 of the photoelectric converter 10, a predetermined voltage difference $\Delta V$ may be applied between the counter electrode 13 and the pixel electrode 11 during an exposure time. By applying the voltage to the counter electrode 13 such that the counter electrode 13 is higher in potential than the pixel electrode 11, the pixel electrode 11 may collect, as signal charges, charges having a positive polarity, such as holes, out of positive and negative charges generated in the photoelectric conversion layer 12 in response to the entrance of light. The signal charges are temporarily accumulated in the charge accumulation region having the conductive structure 52 as part thereof. Like the conductive structure 52, the impurity region 111 formed in the semiconductor substrate 110, and the pixel electrode 11 of the photoelectric converter 10, and the gate electrode 22e of the signal detecting transistor 22 function as part of the charge accumulation region temporarily accumulating the signal charges.

Exemplary Driving Method of Imaging Device 100A

Figure 4:
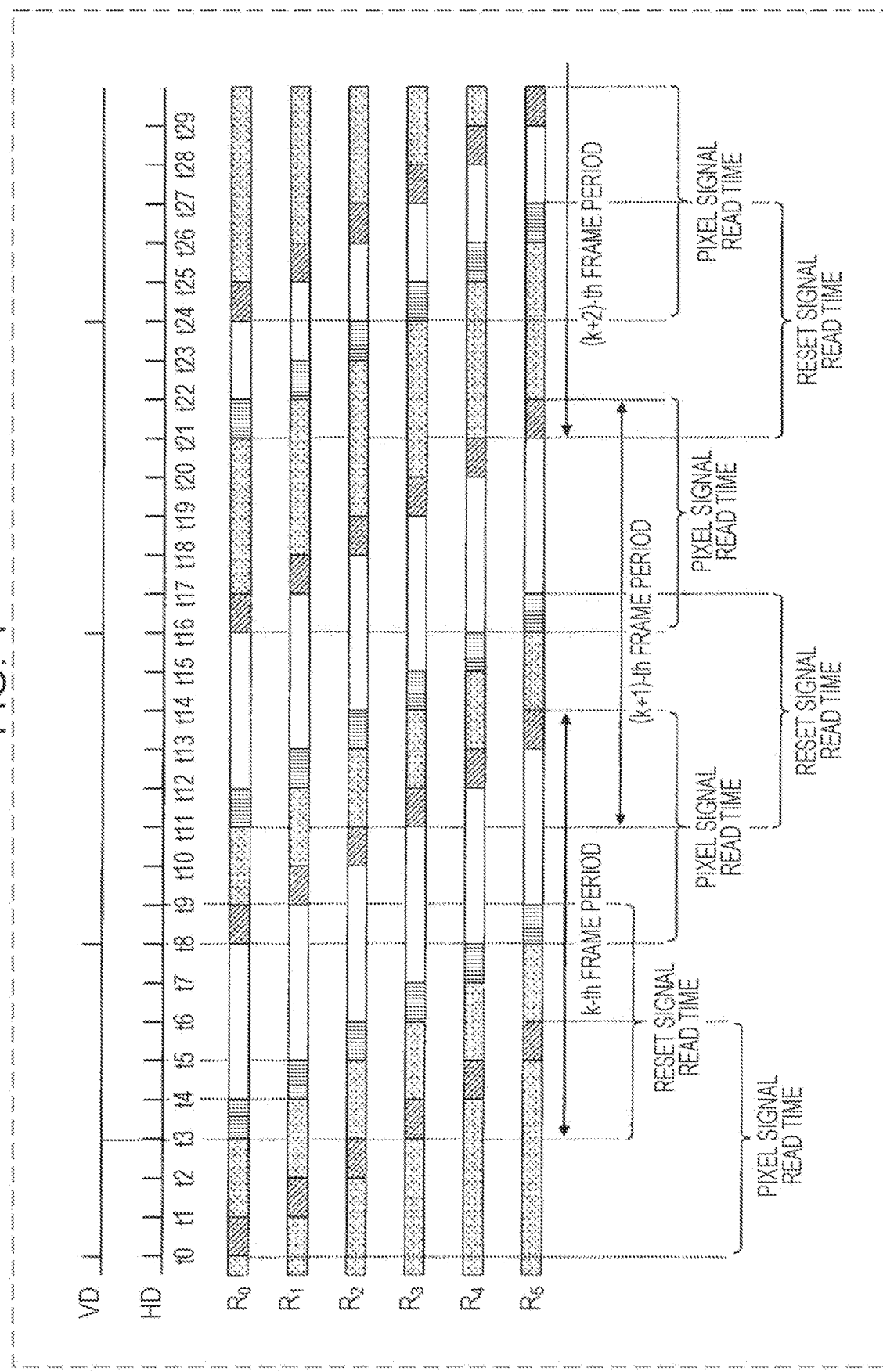
FIG. 4 illustrates an example of a driving method of the imaging device of the first embodiment of the disclosure.
Figure 5:
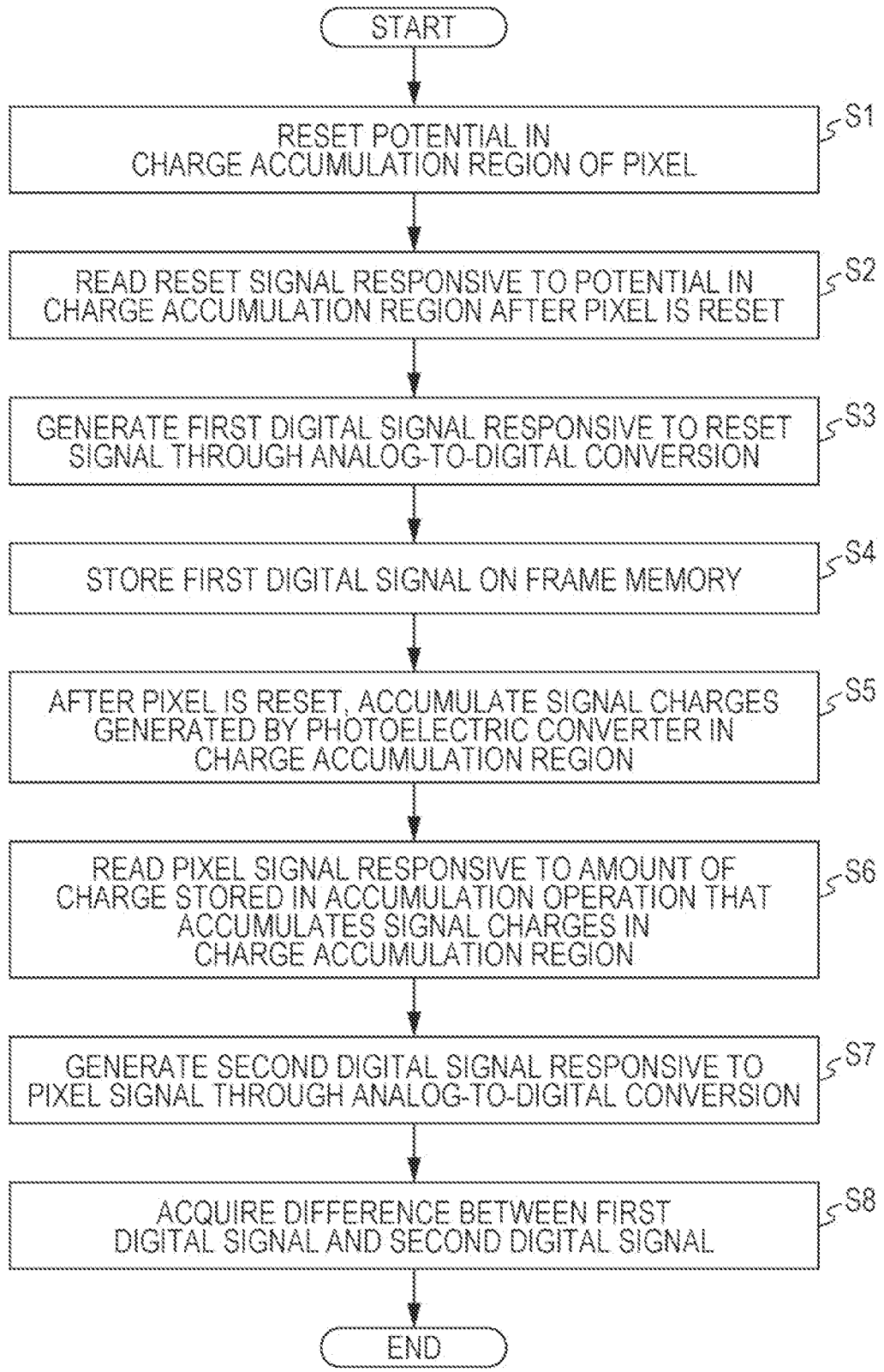
FIG. 5 is a flowchart illustrating an example of the driving method of the imaging device of the first embodiment of the disclosure.

FIGS. 4 and 5 illustrate an example of a driving method of the imaging device in accordance with the first embodiment of the disclosure. The top chart in FIG. 4 illustrates pulses of a vertical synchronization signal VD. The rise of each pulse of the vertical synchronization signal VD indicates the start of the time duration for reading a pixel signal. The second chart from top in FIG. 4 illustrates pulses of a horizontal synchronization signal HD. The time duration from the rise of one pulse to the rise of the next pulse corresponds to 1 H that is a horizontal scanning period.

FIG. 4 also illustrates multiple blocks indicating operations of the pixels Px included in an imaging region. For simplicity of explanation, the rows of the pixels Px are six rows of 0th row $R_0$ through fifth row $R_5$ and the operations of the pixels Px are illustrated by multiple rectangular blocks at the six rows. The 0th row $R_0$ of the pixels Px includes the first pixel Px1 and the second pixel Px2 and the first row $R_1$ includes the third pixel Px3 and the fourth pixel Px4. In FIG. 4, blank rectangular blocks schematically represent the exposure time of a frame period, and vertical-line-hatched rectangular blocks represent a time duration for reading a reset level corresponding to a signal level during darkness. Slant-line-hatched rectangular blocks represent a time duration for reading the pixel signal representing an image of a subject.

Referring to FIG. 5, the driving method of the imaging device includes the following steps. In step S1, the potential of the charge accumulation region of each pixel is reset. In step S2, the reset signal responsive to the potential of the charge accumulation region after the resetting of the pixel is read. In step S3, the first digital signal responsive to the reset signal is generated via AD conversion. In step S4, the first digital signal is stored on the frame memory. In step S5, the signal charges generated by the photoelectric converter are accumulated in the charge accumulation region after the resetting of the pixels. In step S6, the pixel signal responsive to an amount of charges accumulated in the charge accumulation region in step S5 is read. In step S7, the second digital signal responsive to the pixel signal is generated via the AD conversion. In step S8, the difference between the first digital signal and the second digital signal is obtained. The exemplary driving method of the imaging device is described in detail with reference to FIG. 4.

Operation resetting Potential at Charge Accumulation Region

FIG. 4 illustrates an operation of rolling shutter to perform exposure and signal reading on a per row basis of the pixels. The 0th row $R_0$ out of the 0th row $R_0$ through fifth row $R_5$ may now be considered. When an image is captured, the charge accumulation region of the pixels Px is first reset. Referring to FIG. 4, let k represent an integer of 0 or higher. During a k-th frame period, the pixels belonging to the 0th row $R_0$ start to be reset at time t3.

Specifically, the potential of the node FD is set to the potential of the reset voltage line 196 by turning the reset transistor 26 on. In other words, the voltage of the pixel electrode 11 of the photoelectric converter 10 is set to the reset voltage $V_{RST}$. As understood from FIGS. 2 and 3, the gate electrode 22e of the signal detecting transistor 22 in the reading circuit 20 is electrically connected to the pixel electrode 11 via the conductive structure 52, outputting a signal responsive to the potential of the pixel electrode 11. Specifically, the reading circuit 20 outputs an analog signal responsive to the potential of the pixel electrode 11 via a source follower including the signal detecting transistor 22.
Operation Reading Reset Signal By turning the address transistor 24 on after turning the reset transistor 26 off, the signal responsive to the reset voltage $V_{RST}$ applied to the gate electrode 22e of the signal detecting transistor 22 is output to the corresponding output signal line. The signal then output to the output signal line is an analog signal representing a reset level and typically contains reset noise created in the turn-off of the reset transistor 26. For example, in the circuit configuration described with reference to FIG. 2, the reset signal read from a pixel belonging to the 0th row $R_0$ is input to the first AD converter 141 via the corresponding one of the first output signal lines $S_j$.
Operation Generating First Digital Signal Responsive to Reset Signal The first AD converter 141 converts the reset signal input thereto into a digital signal. After reading the reset signal, the address transistor 24 is turned off. With the address transistor 24 of the pixel belonging to the 0th row $R_0$ turned off, the reading of the reset signal from the pixel belonging to the 0th row $R_0$ is complete.
Operation Storing First Digital Signal on First Frame Memory As schematically illustrated in FIG. 4, the reading process is successively performed on a per row basis in synchronization with the horizontal synchronization signal HD. The 1 H period, namely, the time interval of the pulses of the horizontal synchronization signal HD represents a time duration extending from the selection of one row to the selection of the next row. In this example, the resetting of the pixels belonging to the 0th row $R_0$ and the reading of the reset signal are performed during the time duration from time t3 to time t4. The resetting of the pixels belonging to the first row $R_1$ and the reading of the reset signal are performed during the time duration from time t4 to time t5. As described above, the read time of the reset level includes a reset time used to reset the potential of the charge accumulation region of the pixel.

In the circuit configuration described with reference to FIG. 2, the reset signal read from the pixels belonging to the first row $R_1$ is input to the second AD converter 142 via the corresponding one of the second output signal lines $T_j$ rather than the first output signal lines $S_j$. Specifically, the reset signal read from the pixels at an even row and the reset signal read from the pixels at an odd row are input to the first AD converter 141 or the second AD converter 142 via mutually different output signal lines. The reset signal input to the second AD converter 142 is also converted to a digital signal via the AD conversion. Digital signals respectively output from the first AD converter 141 and the second AD converter 142 are input to the image processor 170A respectively via the first digital I/F 161 and the second digital I/F 162. The first digital signals responsive to the reset signals read from time t3 to time t9 in FIG. 4 are temporarily stored on the first frame memory 171 in the image processor 170A.
Operation Accumulating Signal Charges Generated via Photoelectric Conversion The pixels belonging to the 0th row $R_0$ are again considered. The exposure time starts when the reset transistor 26 is turned off after reading the reset signal. In this example, concerning the 0th row $R_0$, a time duration from time t4 to time t8 is an exposure time in a k-th frame period. The exposure time is a time duration throughout which signal charges being responsive to an amount of exposure and generated by the photoelectric converter 10 are accumulated in the charge accumulation region. The length of the exposure time of each row of the pixels Px is within a range of 1/60 to 1/16000 second.

The counter electrode 13 of the photoelectric converter 10 of each pixel Px is supplied with a predetermined voltage V1 via the voltage line 192 by the power supply circuit 190 and is thus maintained at a potential higher than the pixel electrode 11. The potential of the pixel electrode 11 is determined by the reset voltage $V_{RST}$ and a bias voltage $(V1-V_{RST})$ is applied between the pixel electrode 11 and the counter electrode 13 after the resetting.

The counter electrode 13 is set to be relatively higher in potential than the pixel electrode 11 such that the pixel electrode 11 collects positive charges of charge pairs generated through the photoelectric conversion. A PN junction formed in the semiconductor substrate 110 in response to the formation of the impurity region 111 serves as a junction capacitance that temporarily accumulates positive charges collected by the pixel electrode 11. If holes are used as the signal charges, the potential of the impurity region 111 serving as the charge accumulation region rises as the signal charges are accumulated in the impurity region 111. In a typical embodiment of the disclosure, the relationship $(V1-V_{RST})>0$ holds true. Alternatively, electrons may be used as the signal charges by applying a voltage to the counter electrode 13 such that the counter electrode 13 is lower in potential than the pixel electrode 11.
Operation Reading Pixel Signal Responsive to Accumulated Amount of Charge The pixel signal is read after the elapse of a predetermined duration of time after the accumulation of the signal charges. The reading of the signal from the pixel belonging to the 0th row $R_0$ start at time t8 in response to the vertical synchronization signal VD. As described above, the reading circuit 20 of each pixel belonging to the 0th row $R_0$ outputs an analog signal responsive to the potential of the pixel electrode 11 to the corresponding one of the first output signal lines. The signal read from the pixel of the 0th row $R_0$ is the analog signal responsive to the amount of charge accumulated in the charge accumulation region during the exposure time of the 0th row $R_0$ and is a pixel signal representing an image of a subject responsive to ambient light, such as sunlight. The pixel signal contains reset noise created in the reset operation performed prior to the exposure time. After reading the pixel signal, the address transistor 24 is turned off again.
Operation Generating Second Digital Signal Responsive to Pixel Signal The exposure of each pixel and reading of the pixel signal from each pixel are performed on a per row basis of the pixels Px as illustrated in FIG. 4. When the reading of the first pixel signals from the 0th row $R_0$ through the fifth row $R_5$ is complete, the k-th frame period also ends.

In a way similar to the reading of the reset signal, the pixel signals read from the pixels of the 0th row $R_0$, the second row $R_2$, and the fourth row $R_4$ are sent to the first AD converter 141 via the first output signal lines $S_j$. On the other hand, the pixel signals read from the first row $R_1$, the third row $R_3$, and the fifth row $R_5$ are sent to the second AD converter 142 via the second output signal lines $T_j$. The first AD converter 141 and second AD converter 142 performs the AD conversion on the received pixel signals on a per row basis and generates the second digital signal responsive to the pixel signals. The generated second digital signal is sent to the image processor 170A via the first digital I/F 161 or the second digital I/F 162.

Operation Calculating Difference Between First Digital Signal and Second Digital Signal The image processor 170A calculates the difference between the second digital signal responsive to the pixel signal and the first digital signal responsive to the reset signal and outputs the difference as data on a pixel value. As described above, the reset noise created in resetting is superimposed on the reset signal read from the pixel after the resetting of the potential of the charge accumulation region. The reading of the reset signal is performed in a nondestructive manner and the potential of the charge accumulation region is not reset again during a time duration until the reading of the pixel signal. The pixel signal responsive to the amount of charge accumulated in the charge accumulation region during the exposure time is has the reset noise superimposed thereon. According to the first embodiment of the disclosure, after the first digital signal responsive to the reset signal and the second digital signal responsive to the pixel signal are obtained, the difference between theses digital signals is calculated. By subtracting the first digital signal responsive to the reset signal from the second digital signal responsive to the pixel signal, the reset noise may be substantially removed. As a result, the effect of the reset noise may be substantially canceled.

Figure 6:
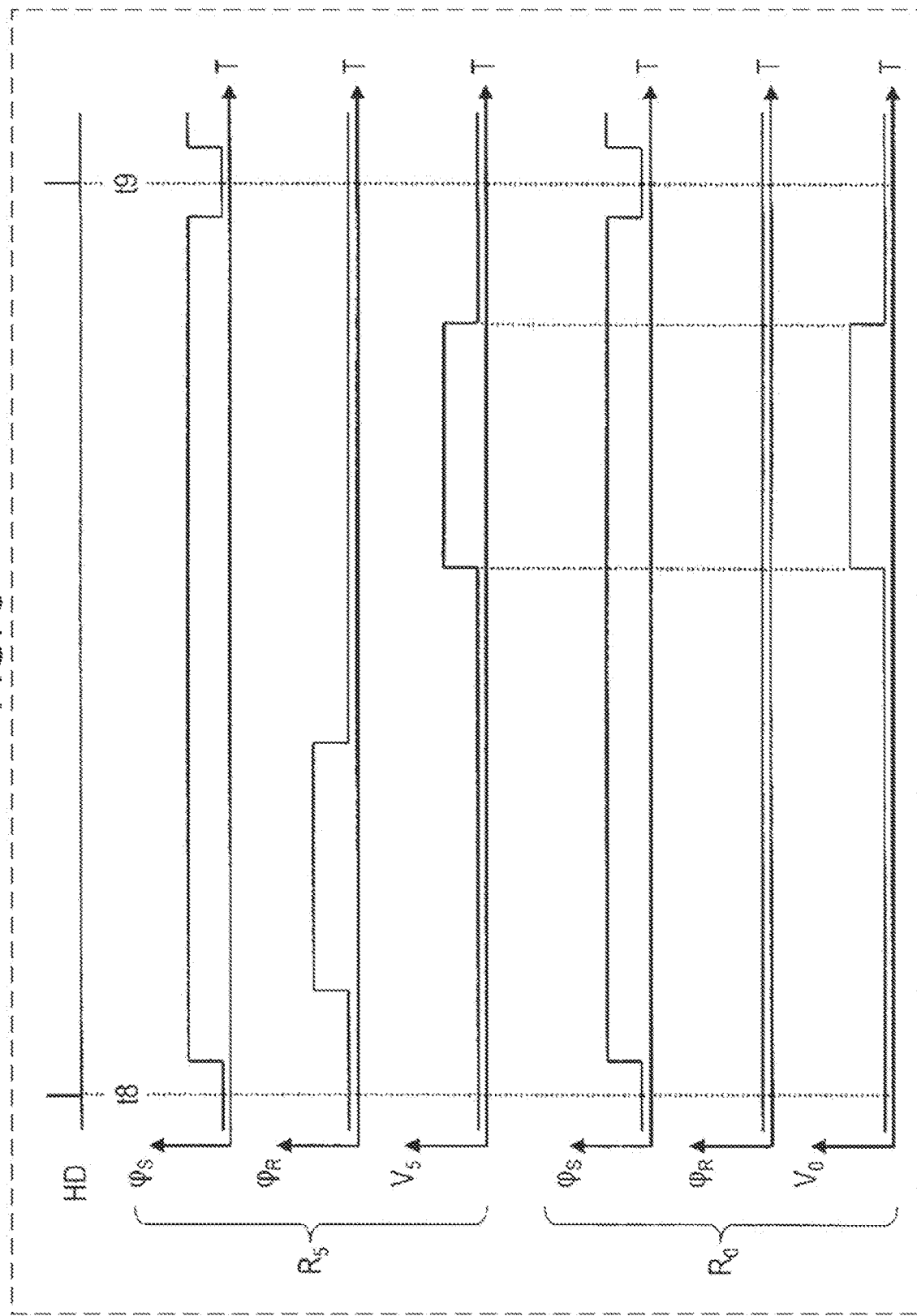
FIG. 6 schematically illustrates an operation of reading circuits at pixels at 0th row $R_0$ and an operation of reading circuits at pixels at a fifth row $R_5$ during 1 H period from time t8 to time t9 illustrated in FIG. 4.

In view of the time duration from time t8 to time t9 in FIG. 4, the reading of the pixel signal from the pixels of the 0th row $R_0$ and the reading of the reset signal from the pixels of the fifth row $R_5$ are performed in parallel. FIG. 6 illustrates the operation of the reading circuits 20 of the pixels of the 0th row $R_0$ and the operation of the reading circuits 20 of the pixels of the fifth row $R_5$ during the 1 H period from time t8 to time t9 illustrated in FIG. 4. Referring to FIG. 6, chart $\phi_S$ represents the waveform of an address control signal applied to the gates of the address transistors 24 in the reading circuits 20 and chart $\phi_R$ represents the waveform of a reset control signal applied to the gates of the reset transistor 26 in the reading circuits 20. Chart $V_0$ schematically illustrates a time duration throughout which the signal read from the pixels of the 0th row $R_0$ is AD converted by the first AD converter 141. In other words, chart $V_0$ schematically illustrates the waveform of the output of the first AD converter 141. Similarly, chart $V_5$ schematically illustrates a time duration throughout which the signal read from the pixels of the fifth row $R_5$ is AD converted by the second AD converter 142. In other words, chart $V_5$ schematically illustrates the waveform of the output of the second AD converter 142.

Figure 7:
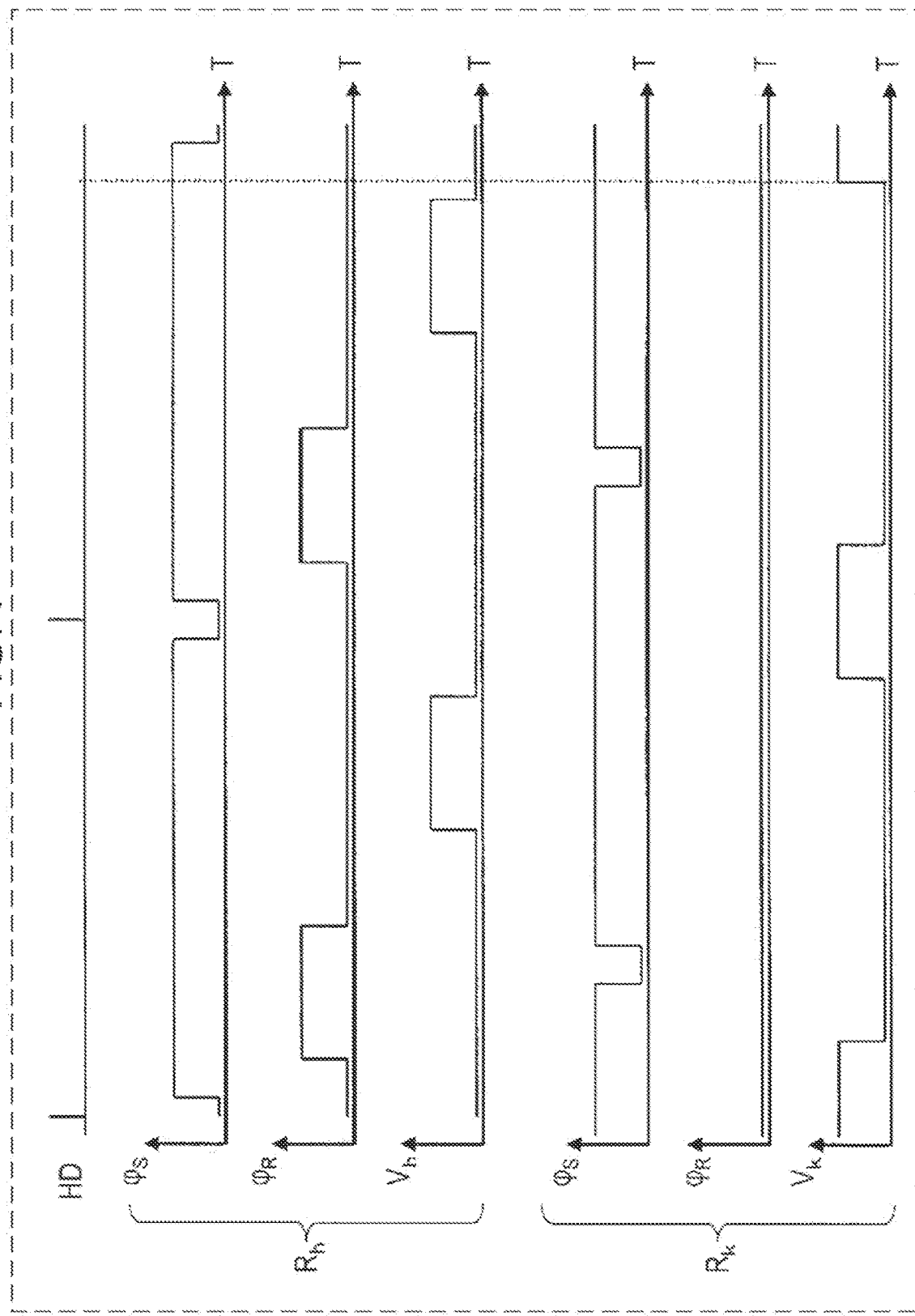
FIG. 7 schematically illustrates an operation of reading circuits at pixels at h-th row and k-th row mutually different in a pixel array.

As understood from charts $V_5$ and $V_0$ in FIG. 6, the timing of the first digital signal responsive to the reset signal of the pixels of the fifth row $R_5$ matches the output timing of the second digital signal responsive to the pixel signal of the pixels of the 0th row $R_0$. In this way, the first AD converter 141 and second AD converter 142 may output the results of the AD conversion of one row of the pixels Px at the same timing. According to the first embodiment of the disclosure, however, the output of the results of the AD conversion of the first AD converter 141 may not necessarily match in timing the output of the results of the AD conversion of the second AD converter 142. Referring to FIG. 7, the output timing of the digital signal of the first AD converter 141 may shift from the output timing of the digital signal of the second AD converter 142. FIG. 7 schematically illustrates the operation of the reading circuits 20 of the pixels at h-th row and k-th row mutually different from each other in the pixel array.

Referring to FIG. 2, each of the first output signal line and second output signal line respectively connected to the AD converters is arranged for each column of the pixels Px. Some of the pixels Px are thus connected to the first output signal line and the rest of the pixels Px is connected to the second output signal line. The reading of the reset signal from one pixel and the reading of the pixel signal from another pixel may be performed in parallel. In this way, the parallel operation of reading the reset signal from the one pixel and reading of the pixel signal from another pixel is permitted such that a portion of the read time of the reset signal overlaps a portion of the read time of the pixel signal. The length of the exposure time may thus be flexibly changed. For example, the exposure time may be shortened to improve the frame rate.

Figure 8:
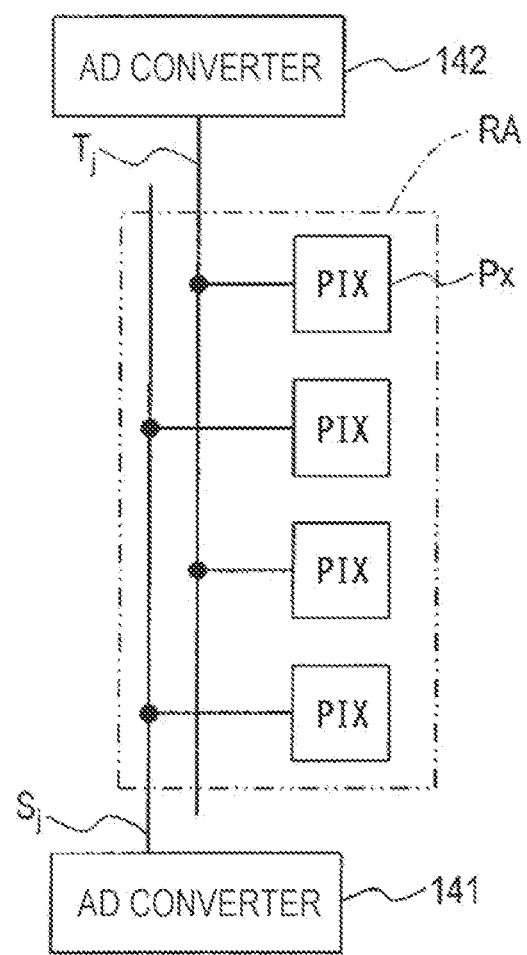
FIG. 8 schematically illustrates a layout example of AD converters with respect to the pixel array.
Figure 9:
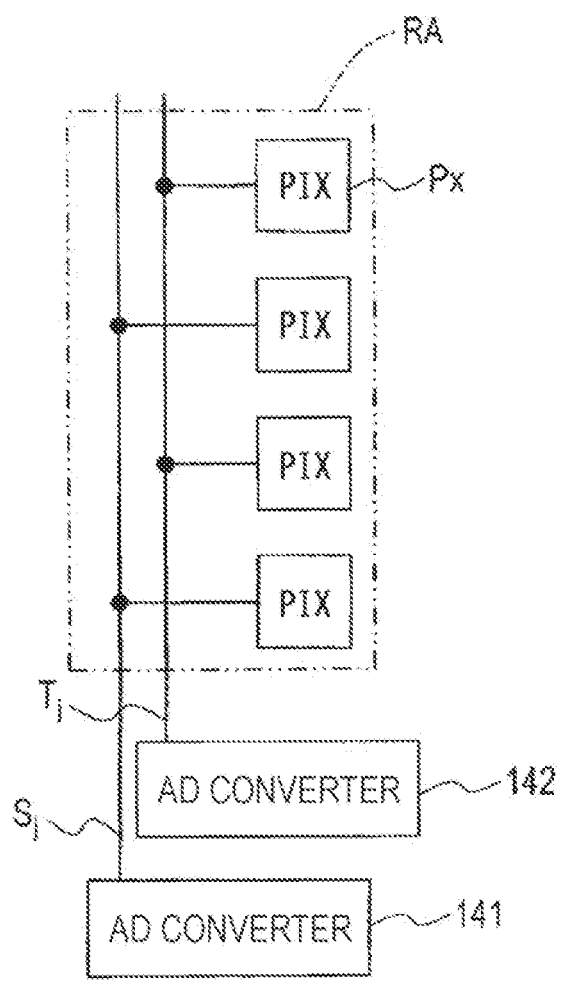
FIG. 9 schematically illustrates another layout example of the AD converters with respect to the pixel array.
Figure 10:
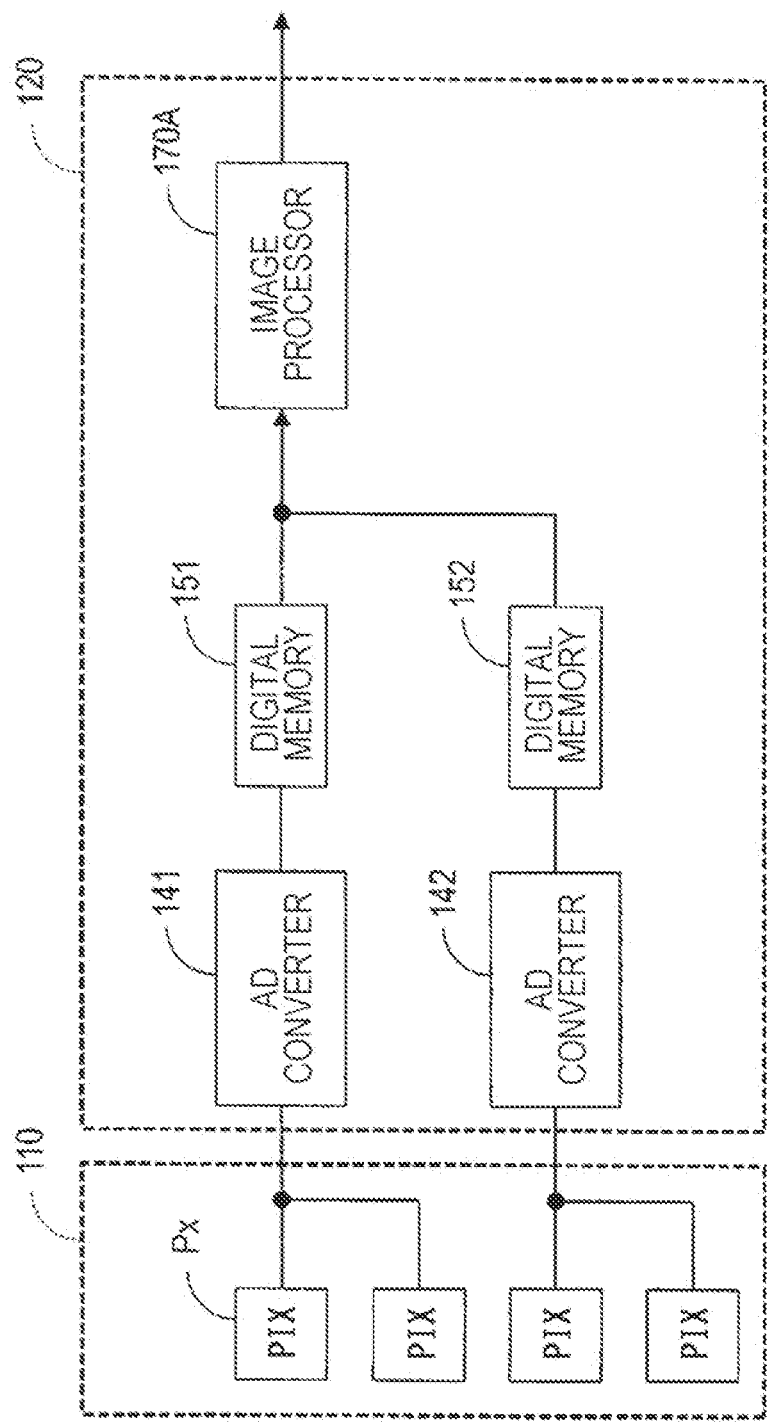
FIG. 10 schematically illustrates a layout example of the AD converters in a semiconductor substrate having multiple pixels thereon.

In the example illustrated in FIGS. 1 and 2, the first AD converter 141 and second AD converter 142 are located along two sides that face each other across an imaging region RA including the pixels Px as schematically illustrated in FIG. 8. The location of the first AD converter 141 and second AD converter 142 is not limited to the example in FIG. 8. As schematically illustrated in FIG. 9, the first AD converter 141 and second AD converter 142 may be located along or near a side of the rectangular shape of the imaging region RA. One or both of the first AD converter 141 and second AD converter 142 may not necessarily be formed in the semiconductor substrate 110 including the pixels Px. As schematically illustrated in FIG. 10, the first AD converter 141, second AD converter 142, first digital memory 151, second digital memory 152 and image processor 170A may be located in another circuit substrate 120 different from the semiconductor substrate 110.

Figure 11:
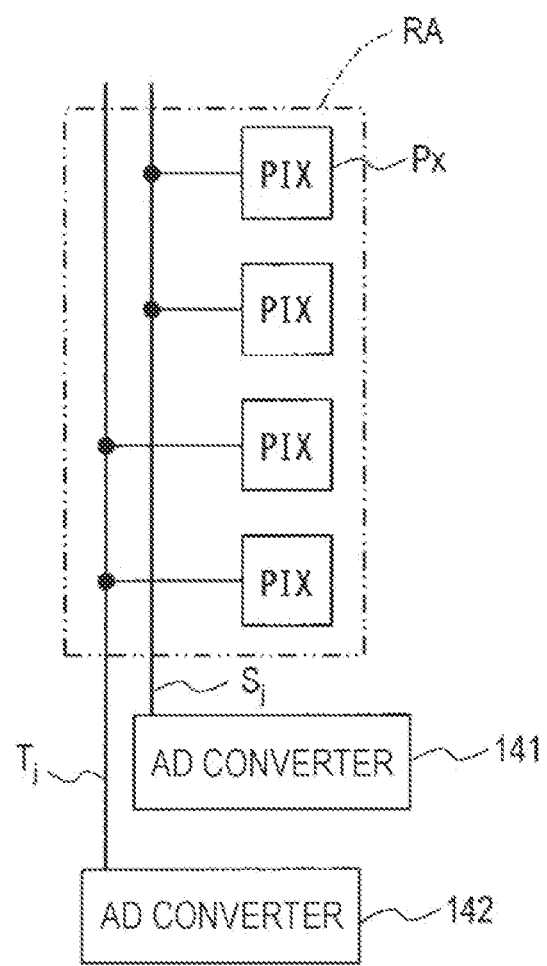
FIG. 11 schematically illustrates a connection example of pixels to output signal lines.
Figure 12:
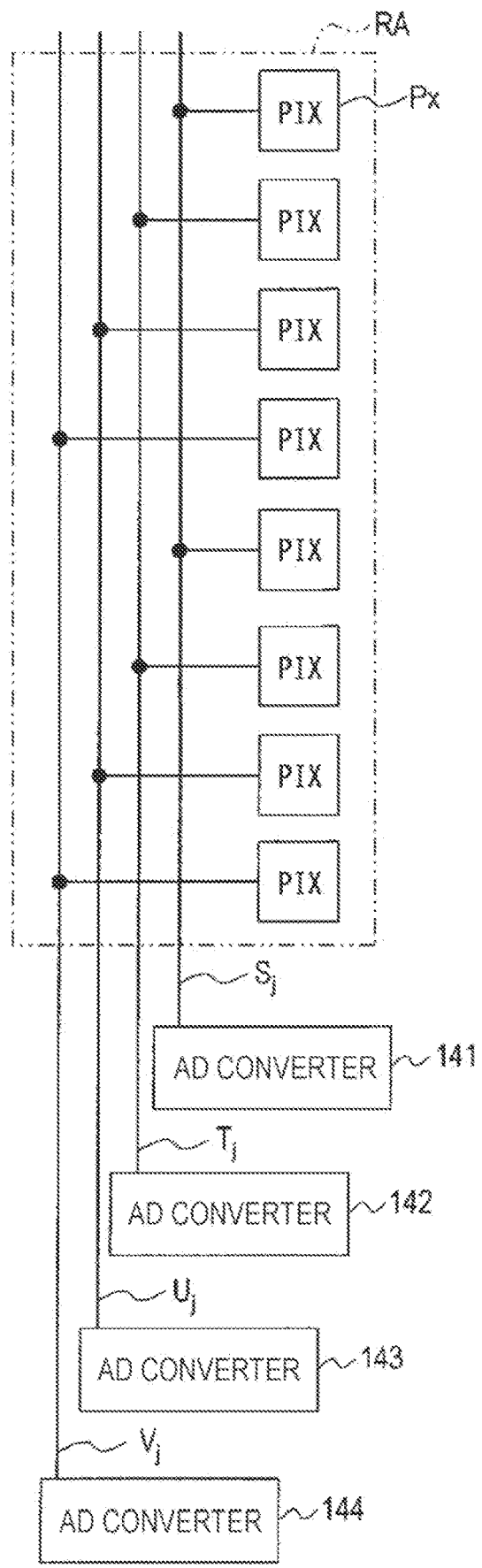
FIG. 12 schematically illustrates another connection example of the pixels to the output signal lines.

In the example illustrated in FIGS. 8 and 9, the pixels at the even rows and the pixels at the odd rows of the pixels Px are respectively connected to the first output signal lines $S_j$ and second output signal lines $T_j$. The connection of the pixels to the first output signal lines $S_j$ and second output signal lines $T_j$ is not limited to the way described above. FIGS. 11 and 12 schematically illustrate another connection example of the pixels to the output signal lines. Referring to FIG. 11, the first output signal line $S_j$ and the second output signal line $T_j$ are alternately connected to every two rows of the pixels Px. Referring to FIG. 12, four output signal lines, namely, the first output signal line $S_j$, second output signal line $T_j$, third output signal line $U_j$, and fourth output signal line $V_j$ are respectively arranged for the rows and thus each output signal line is connected to every four rows of the pixels Px. As illustrated in FIG. 12, the first output signal line $S_j$, second output signal line $T_j$, third output signal line $U_j$, and fourth output signal line $V_j$ are respectively connected to the first AD converter 141, second AD converter 142, third AD converter 143, and fourth AD converter 144.

Figure 13:
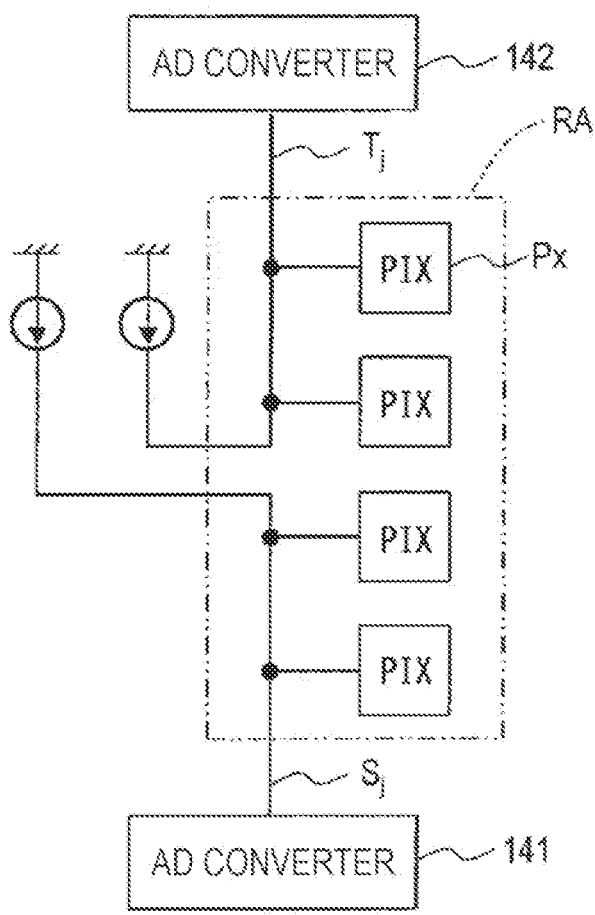
FIG. 13 schematically illustrates another connection example of the pixels to the output signal lines.

According to the first embodiment of the disclosure, a subset of the pixels Px may be connected to the first output signal line $S_j$ connected to the first AD converter 141 and another subset of the pixels Px may be connected to the second output signal line $T_j$ connected to the second AD converter 142. Referring to FIG. 13, the imaging region RA is divided into two regions and depending on which region each pixel belongs to, a determination as to which of the first AD converter 141 and second AD converter 142 the pixels Px are to be connected to may be made.

Referring to FIG. 13, the imaging region RA is segmented into upper and lower half regions. As schematically illustrated in FIG. 13, pixels of the pixels Px located within the lower half region are connected to the first output signal line $S_j$ connected to the first AD converter 141 and pixels of the pixels Px located within the upper half region are connected to the second output signal line $T_j$ connected to the second AD converter 142. In this connection configuration, the reading of the pixel signal may be performed on a per row basis from the pixels located within the upper half region of the imaging region RA while the reading of the reset signal is performed on a per row basis from the pixels located within the lower half of the imaging region RA. Since the read time of the reset signal from one subset of pixels is allowed to overlap the read time of the pixel signal form another subset of the pixels, the effect of shortening the frame rate may be provided.

Modifications of First Embodiment

When a single pixel in the imaging region RA is considered in the above discussion, one of the first AD converter 141 and second AD converter 142 generates both the first digital signal responsive to the reset signal read from the pixel and the second digital signal responsive to the pixel signal. However, as described below, depending on whether the analog signal read from the pixel is the reset signal or the pixel signal, which of the first AD converter 141 and the second AD converter 142 may be switchably selected to output the digital signal responsive to the analog signal read from the pixel.

Figure 14:
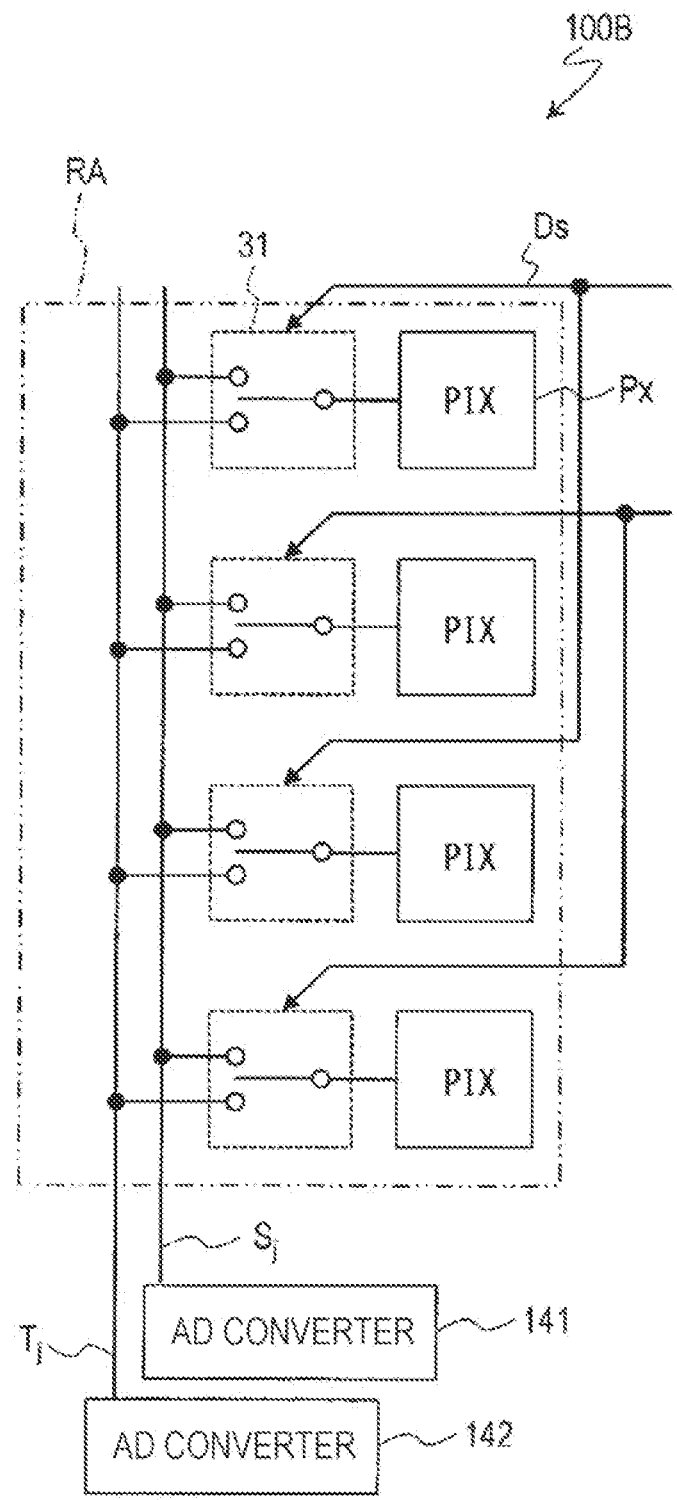
FIG. 14 schematically illustrates a modification of the imaging device of the first embodiment of the disclosure.

FIG. 14 illustrates a modification of the imaging device of the first embodiment of the disclosure. Like the imaging device 100A, an imaging device 100B in FIG. 14 includes the pixels Px, multiple pairs of the first output signal lines $S_j$ and the second output signal lines $T_j$ respectively arranged for the columns of the pixels Px, first AD converter 141 and second AD converter 142. For simplicity of drawing, FIG. 14 illustrates four pixels at a column of the pixels Px. Referring to FIG. 14, elements, such as the image processor 170A, common to the imaging device 100A, are not illustrated.

In comparison with the imaging device 100A, as illustrated in FIG. 14, all pixels belonging to the same column are electrically connected to both the first output signal line $S_j$ and the second output signal line $T_j$ belonging to the column. Referring to FIG. 14, first signal switches 31 are inserted between each of the pixels in the imaging region RA and the first output signal line $S_j$ and second output signal line $T_j$ corresponding to the column of the pixels. The first signal switches 31 may be part of each pixel.

Each of the first signal switches 31 arranged for each pixel switches the pixel between being connected to the first output signal line $S_j$ and being connected to the second output signal line $T_j$, depending on whether the analog signal read from the pixel is the reset signal or the pixel signal. If the output from the reading circuit 20 of the pixel is the reset signal, the first signal switch 31 establishes a connection between the reading circuit 20 of the pixel and the first output signal line $S_j$. If the output from the reading circuit 20 of the pixel is the pixel signal, the first signal switch 31 establishes a connection between the reading circuit 20 and the second output signal line $T_j$. The first signal switch 31 may be implemented in the form of a circuit including a switching element, such as a field-effect transistor formed in the semiconductor substrate 110. These switching elements are driven in synchronization with the reading circuit 20 of the pixel in response to a drive signal Ds from the controller 220. In this way, the first signal switch 31 establishes a connection between the reading circuit 20 and the first output signal line $S_j$ when the reset signal is output from the reading circuit 20, and establishes a connection between the reading circuit 20 and the second output signal line $T_j$ when the pixel signal is output from the reading circuit 20.

In this configuration, the first AD converter 141 connected to the first output signal line $S_j$ performs the AD conversion on the reset signal read from each pixel and the second AD converter 142 connected to the second output signal line $T_j$ performs the AD conversion on the pixel signal read from each pixel. In this way, the AD converter outputting the first digital signal and the AD converter outputting the second digital signal may be implemented in the imaging device. In this configuration as well, the reading of the reset signal from a pixel at one row within the imaging region RA is performed in parallel with the reading of the pixel signal from a pixel at another row within the imaging region RA. The read time of the reset signal may overlap the read time of the pixel signal, possibly flexibly changing the frame rate. Since the image processor 170A calculates the difference between the first digital signal stored on the first frame memory 171 and the second digital signal corresponding to the first digital signal, the reset noise mixed with these signals may be effectively canceled. As described with reference to FIGS. 6 and 7, the output timing of the first digital signal from the first AD converter 141 may or may not match the output timing of the second digital signal from the second AD converter 142.

Figure 15:
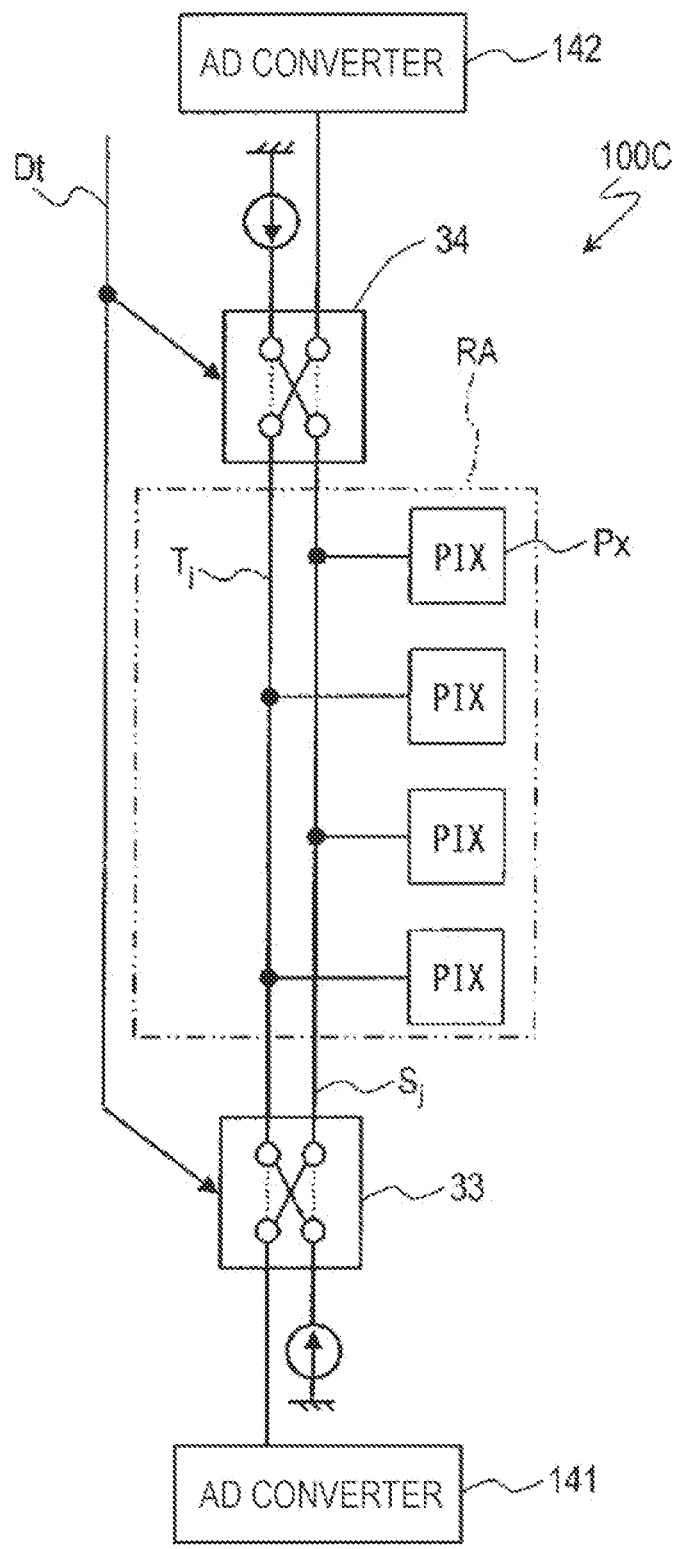
FIG. 15 schematically illustrates another modification of the imaging device of the first embodiment of the disclosure.

As described below, a signal switch may be inserted between the set of output signal lines and the two AD converters instead of between each pixel and the set of output signal lines. FIG. 15 illustrates an imaging device 100C as another modification of the imaging device of the first embodiment of the disclosure. In comparison with the imaging device 100B described with reference to FIG. 14, in the imaging device 100C in FIG. 15, a part of the pixels belonging to one row within the imaging region RA is connected to the first output signal line $S_j$ and the rest of the pixels is connected to the second output signal line $T_j$. Unlike the configuration in FIG. 14, the first signal switch 31 is not arranged between each of the pixels and the first output signal line $S_j$ and second output signal line $T_j$. In the configuration in FIG. 15, a first signal switch 33 is connected between the first output signal line $S_j$ and second output signal line $T_j$ and the first AD converter 141 and a second signal switch 34 is connected between the first output signal line $S_j$ and second output signal line $T_j$ and the second AD converter 142.

The first signal switch 33 and second signal switch 34 switch the output signal lines between being connected to the AD converter and being connected to the source follower power supply in response to the drive signal Dt from the controller 220. Referring to FIG. 15, each of the first signal switch 33 and second signal switch 34 is configured to operate as a four-way switch. The first signal switch 33 and second signal switch 34 are complementary to each other in operation. This is intended to signify that when one of the first signal switch 33 and second signal switch 34 establishes a connection between the first output signal line $S_j$ or the second output signal line $T_j$ and the AD converter, the other of the first signal switch 33 and second signal switch 34 establishes a connection between the output signal line and the source follower power supply. For example, when the first signal switch 33 establishes a connection between the first output signal line $S_j$ and the first AD converter 141, the second signal switch 34 establishes a connection between the first output signal line $S_j$ and the source follower power supply. The first signal switch 33 thus establishes a connection between the second output signal line $T_j$ and the source follower power supply and the second signal switch 34 establishes a connection between the second output signal line $T_j$ and the second AD converter 142.

When the first AD converter 141 performs the AD conversion on the reset signal output from a first pixel with the first AD converter 141 connected to the first pixel via the first output signal line S$_j$, the second AD converter 142 also performs the AD conversion on the pixel signal output from a second pixel with the second AD converter 142 connected to the second pixel via the second output signal line T$_j$. The first signal switch 33 and second signal switch 34 may now be reset as illustrated by dotted lines as schematically illustrated in FIG. 15. In this case, when the first AD converter 141 performs the AD conversion on the reset signal output from the second pixel with the first AD converter 141 connected to the second pixel via the second output signal line T$_j$, the second AD converter 142 performs the AD conversion on the pixel signal output from the first pixel with the second AD converter 142 connected to the first pixel via the first output signal line S$_j$.

In a way similar to the configuration in FIG. 14, one of the first AD converter 141 and second AD converter 142 performs the AD conversion on the reset signal read from each pixel while the other of the first AD converter 141 and second AD converter 142 preforms the AD conversion on the pixel signal read from each pixel. Referring to FIG. 15, the first output signal line S$_j$ is connected to the pixels at the odd rows of the imaging region RA and the second output signal line T$_j$ is connected to the pixels at the even rows of the imaging region RA. The connection configuration of the output signal lines is not limited to this example. Alternatively, a subset of the pixels Px may be connected to the first output signal line S$_j$ while the rest of the pixels Px may be connected to the second output signal line T$_j$.

Second Embodiment

Figure 16:
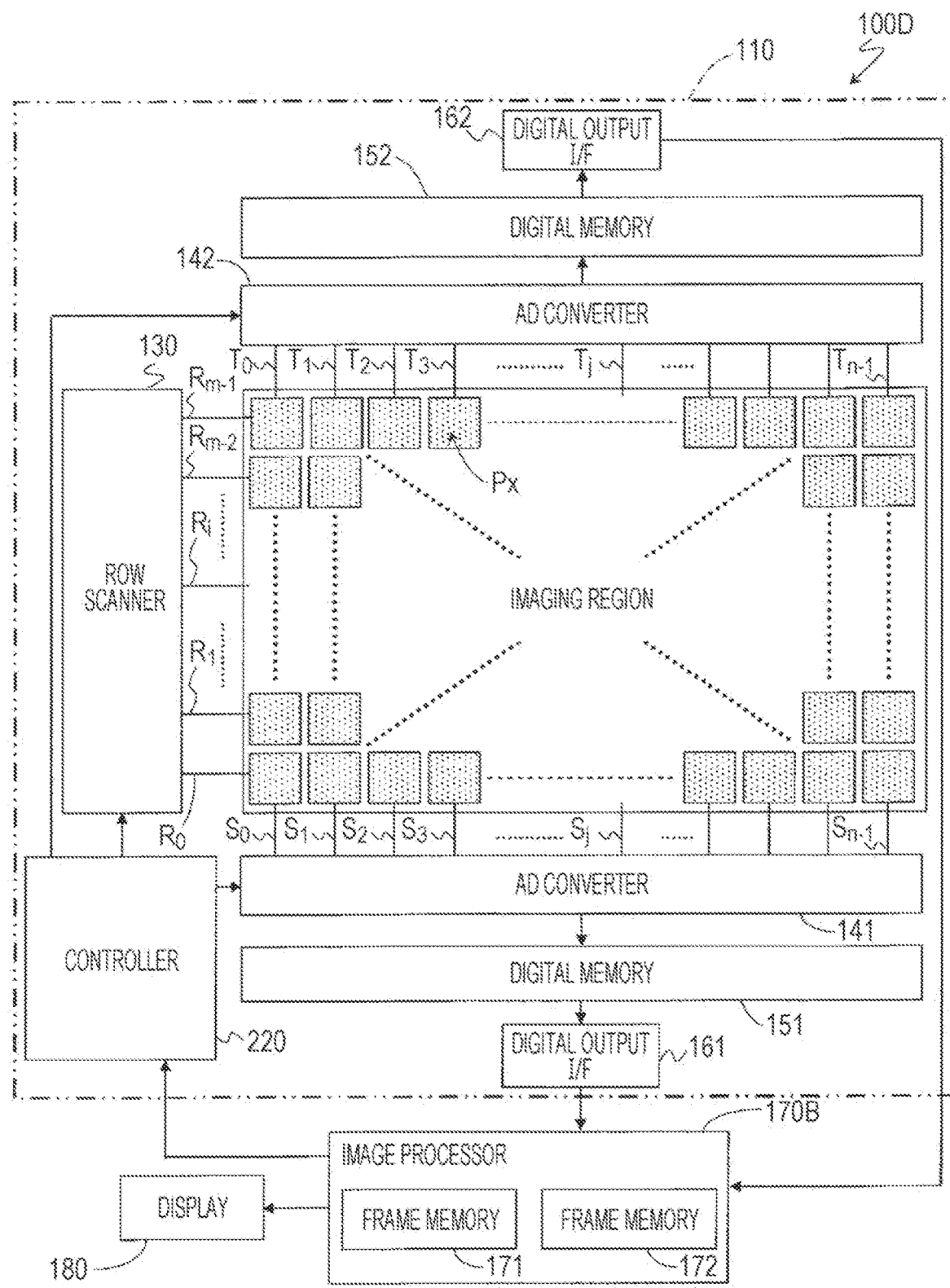
FIG. 16 schematically illustrates an exemplary configuration of an imaging device of a second embodiment of the disclosure.

FIG. 16 schematically illustrates an exemplary configuration of an imaging device 100D of a second embodiment of the disclosure. In comparison with the imaging device 100A in FIG. 1, the imaging device 100D in FIG. 16 includes an image processor 170B in place of the image processor 170A. As schematically illustrated in FIG. 16, the image processor 170B includes, besides the first frame memory 171, a second frame memory 172.

The first frame memory 171 temporarily stores the first digital signal generated from the reset signal representing the reset level while the second frame memory 172 temporarily stores the second digital signal generated from the pixel signal representing the image of a subject. The image processor 170B calculates and outputs a difference between the second digital signal corresponding to image data of one frame and the first digital signal stored on the first frame memory 171. Since the imaging device 100D includes the first frame memory 171 and second frame memory 172 that temporarily stores the second digital signal of one frame, the imaging device may calculate a difference between a digital signal responsive to the pixel signal acquired during the next frame and the second digital signal stored on the second frame memory 172. Alternatively, the first frame memory 171 may be caused to temporarily store the digital signal responsive to the reset signal during a given frame and the second frame memory 172 may then be caused to temporarily store the digital signal responsive to the reset signal responsive to the next frame.

Modifications of Second Embodiment

Figure 17:
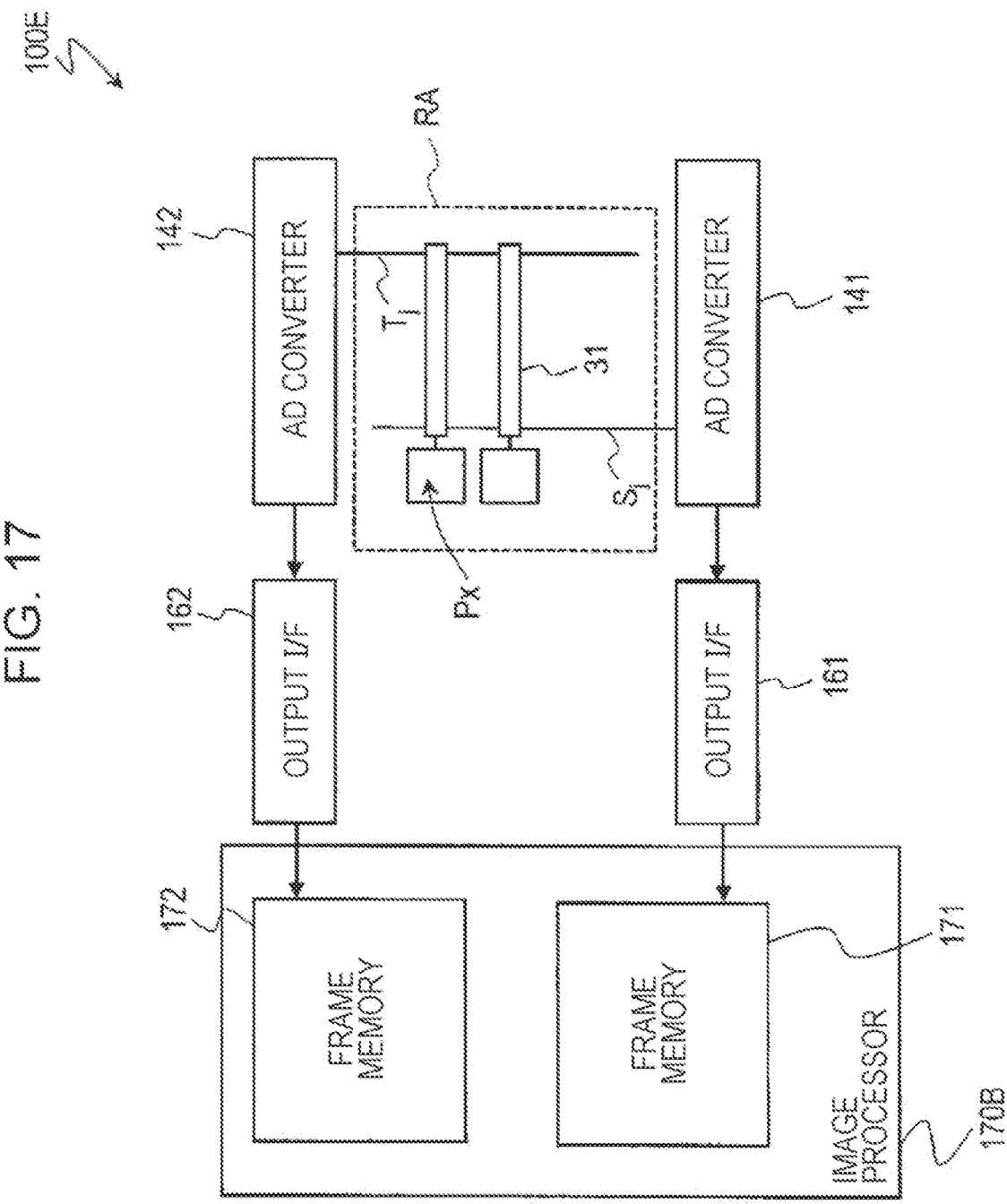
FIG. 17 schematically illustrates a modification of the imaging device of the second embodiment of the disclosure.

FIG. 17 illustrates an imaging device 100E as a modification of the imaging device in accordance with the second embodiment of the disclosure. Referring to FIG. 17, each pixel Px has a connection configuration similar to the connection configuration in FIG. 14. Specifically, each pixel Px in the imaging device 100E in FIG. 17 is electrically connected via the first signal switch 31 to the first output signal line S$_j$ connected to the first AD converter 141 and to the second output signal line T$_j$ connected to the second AD converter 142.

In the connection configuration described with reference to FIG. 14, the reset signal read from each pixel by the reading circuit 20 is output to the first output signal line S$_j$ while each pixel signal read from the pixel by the reading circuit 20 is output to the second output signal line T$_j$. Specifically, the first AD converter 141 outputs the first digital signal to the first digital I/F 161 while the second AD converter 142 outputs the second digital signal to the second digital I/F 162. Referring to FIG. 17, the first digital I/F 161 and second digital I/F 162 respectively function as output ports for the first digital signal and second digital signal.

The first digital signal output from the first digital I/F 161 is stored on the first frame memory 171. The second digital signal output from the second digital I/F 162 is stored on the second frame memory 172. From among the digital signals corresponding to the outputs of the pixels, the first digital signal is stored on the first frame memory 171 and the second digital signal is stored on the second frame memory 172.

Figure 18:
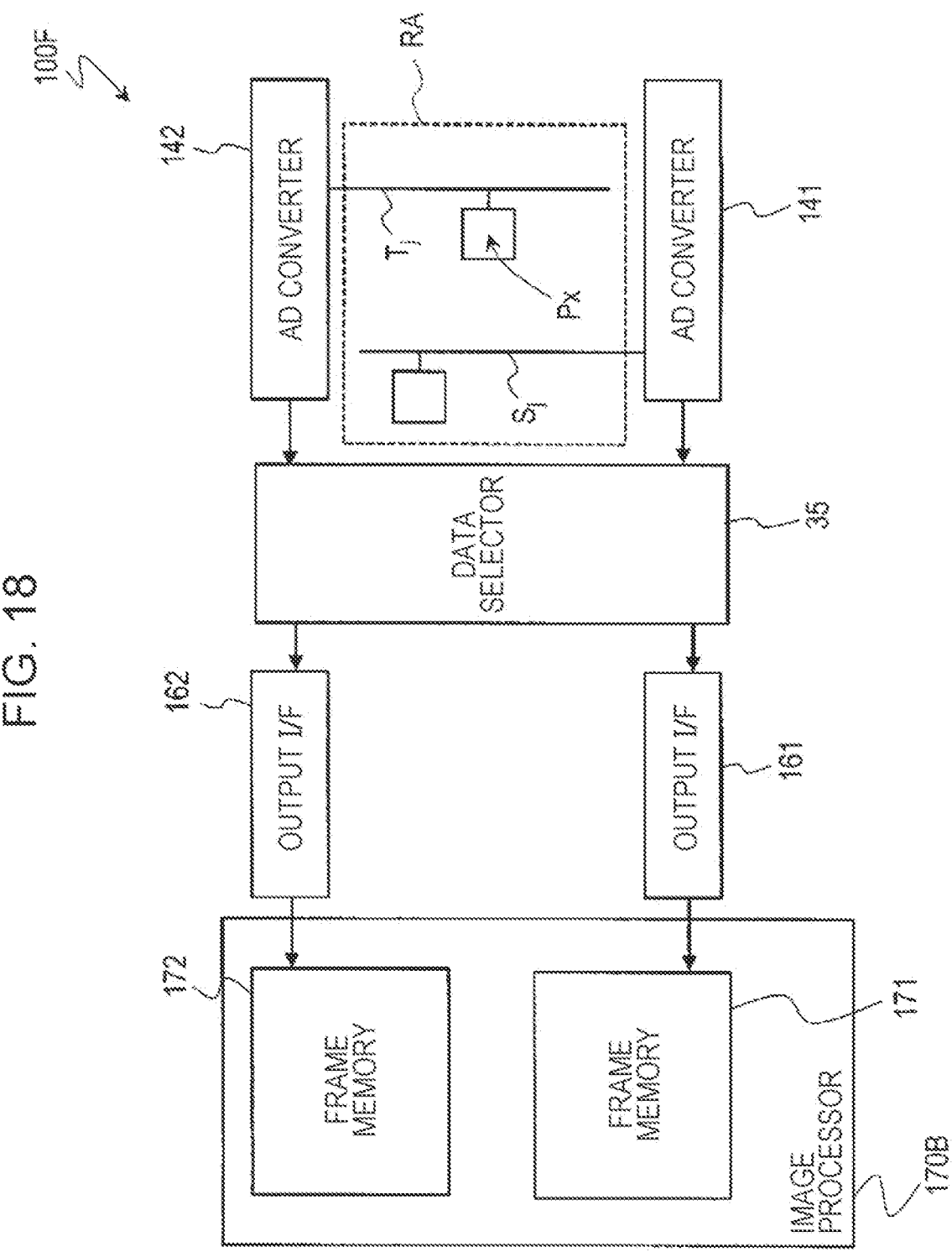
FIG. 18 schematically illustrates another modification of the imaging device of the second embodiment of the disclosure.

FIG. 18 illustrates an imaging device 100F as another modification of the imaging device of the second embodiment of the disclosure. The imaging device 100F in FIG. 18 includes, besides the imaging region RA including the pixels Px and the image processor 170B, a data selector 35 that is electrically connected between the first AD converter 141 and second AD converter 142 and the first frame memory 171 and second frame memory 172.

Referring to FIG. 18, each pixel Px in the imaging device 100F has a circuit configuration similar to the circuit configuration in FIG. 8. Specifically, the pixels at the even rows of the imaging region RA are connected to the first AD converter 141 via the first output signal line S$_j$ while the pixels at the odd rows of the imaging region RA are connected to the second AD converter 142 via the second output signal line T$_j$. The first AD converter 141 outputs to the data selector 35 the first digital signal and second digital signal on the pixels at the even rows of the imaging region RA.

The data selector 35 selectively outputs to the first digital I/F 161 the first digital signal out of the signals received from the first AD converter 141. As a result, the first digital signal on the pixels at the even rows of the imaging region RA is stored on the first frame memory 171. The data selector 35 selectively outputs to the second digital I/F 162 the second digital signal out of the signals received from the first AD converter 141. Specifically, the second digital signal on the pixels at the odd rows of the imaging region RA is stored on the second frame memory 172. Similarly, the data selector 35 selectively outputs the first digital signal to the first digital I/F 161 and the second digital signal to the second digital I/F 162, out of the signals received from the second AD converter 142. In other words, the first digital I/F 161 and second digital I/F 162 respectively function as output ports for the first digital signal and second digital signal.

Depending on whether the input from the first AD converter 141 and second AD converter 142 is the first digital signal responsive to the reset signal or the second digital signal responsive to the pixel signal, the data selector 35 outputs the signals from the AD converters to one of the first digital I/F 161 and second digital I/F 162. In this way, the first digital signal and second digital signal are sorted such that the first digital signal is stored on the first frame memory 171 and the second digital signal is stored on the second frame memory 172. The operation performed depending on whether the signal received from the first AD converter 141 is the first digital signal or the second digital signal may be performed by causing the data selector 35 to operate in synchronization with the first AD converter 141 and second AD converter 142 in response to the drive signal from the controller 220.

Figure 19:
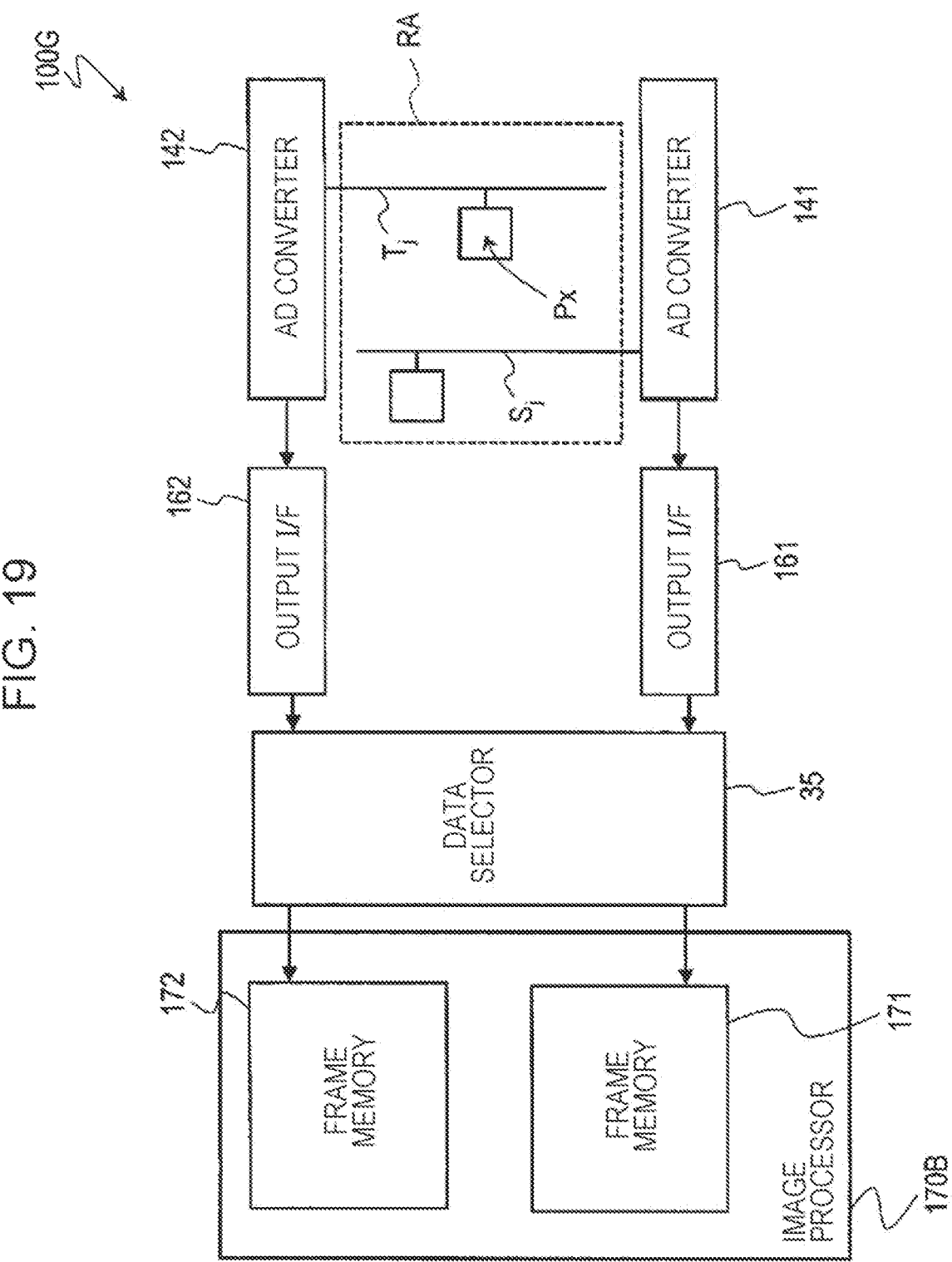
FIG. 19 schematically illustrates another modification of the imaging device of the second embodiment of the disclosure.

FIG. 19 illustrates an imaging device 100G as another modification of the imaging device of the second embodiment of the disclosure. In comparison with the imaging device 100F in FIG. 18, in the imaging device 100G in FIG. 19, the data selector 35 is electrically connected between the first digital I/F 161 and second digital I/F 162 and the first frame memory 171 and second frame memory 172. In a similar way as described with reference to FIG. 18, the data selector 35 in FIG. 19 inputs the first digital signal and second digital signal output from the first AD converter 141 and second AD converter 142 respectively to the first frame memory 171 and second frame memory 172. When the first digital signal is output from the first AD converter 141, the second digital signal may also be output from the second AD converter 142. When the second digital signal is output from the first AD converter 141, the first digital signal may also be output from the second AD converter 142.

Exemplary Drive Method of Imaging Devices 100D through 100G

Figure 20:
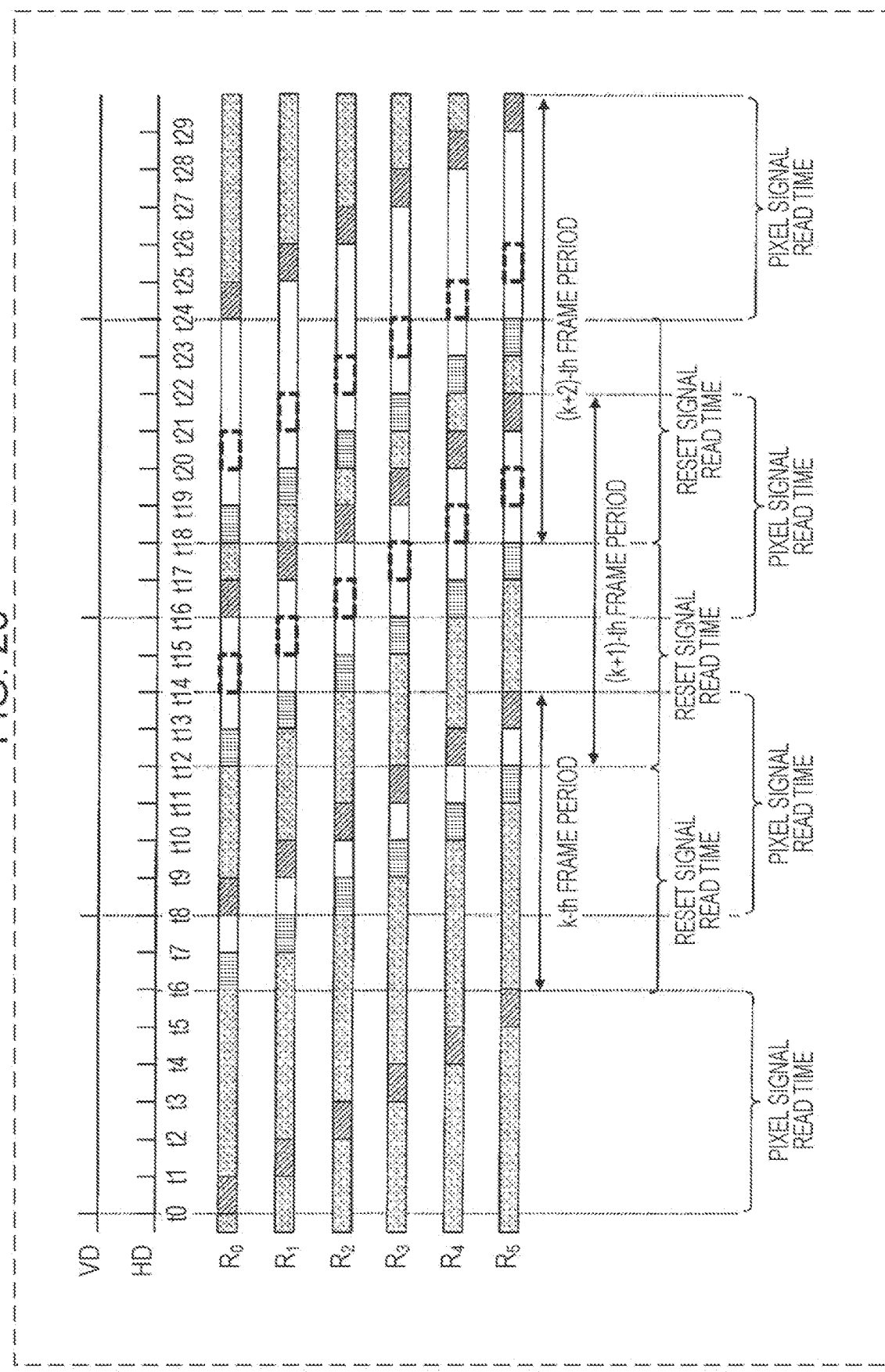
FIG. 20 schematically illustrates an operation example of an imaging device including a first frame memory and a second frame memory.

The exemplary operation of the imaging device having the first frame memory 171 and second frame memory 172 is described below. FIG. 20 illustrates the exemplary operation of the imaging device having the first frame memory 171 and second frame memory 172. FIG. 20 schematically illustrates the operation during k-th, (k+1)-th, and (k+2)-th frame periods.

Referring to FIG. 20, the k-th frame period extends from time t6 serving as read start time of the reset signal from the pixels at the 0th row $R_0$ to time t14 serving as read end time of the pixel signal from the pixels at the fifth row $R_5$. The length of the k-th frame period is eight times the 1 H period. The read time of the pixel signal starts at time t8 in response to the rise of the VD pulse and ends at time t14.

As schematically illustrated in FIG. 20, a portion of the reset signal read time overlaps a portion of the pixel signal read time. For example, concerning the 1H period from time t8 to time t9, the reading of the reset signal from the pixels at the second row $R_2$ is performed in parallel with the reading of the pixel signal from the pixels at the 0th row $R_0$. The first digital signal obtained by AD-converting the read reset signal is temporarily stored on the first frame memory 171 and the second digital signal obtained by AD-converting the read pixel signal is temporarily stored on the second frame memory 172.

According to the second embodiment, the imaging device includes the first frame memory 171 and second frame memory 172 and thus the first digital signal and second digital signal are stored onto the frame memories on a per row basis. With the read time of the reset signal partially overlapping the read time of the pixel signal, the difference between the first digital signal and the second digital signal is calculated after the reading of the reset signal and the pixel signal from all rows of the pixels Px. The imaging device may thus benefit from shortening the exposure time. According to the second embodiment, the exposure time may be set to be shorter than a 1V period.

The k-th frame period has a length eight times the 1 H period. The (k+1)-th frame period is 10 times as long as the 1 H period, and the (k+2)-th frame period is 12 times as long as the 1 H period. Since the first output signal line $S_j$ and second output signal line $T_j$ are arranged on a per column basis of the pixels Px, the reading of signals related to two pixels may be performed at the same column from the pixels Px. As illustrated by thick dashed lines in FIG. 20, concerning the (k+1)-th frame period and the (k+2)-th frame period, the exposure time may be reduced by shifting the reading of the reset signal at each row backwards by twice the 1 H period. The reduction of the exposure time may be useful if photographing is performed when the imaging device suddenly moves from a darker environment to a brighter environment.

If the exposure time is stretched during two consecutive frame periods, the read time of the reset signal during an earlier frame period may possibly overlap the read time of the reset signal during a later frame period. In such a case, the reset signal may be possibly difficult to read part of the row on one of the two frame periods. A range of stretch where the exposure time is stretchable may be preset such that the read times of the reset signal do not overlap during the two consecutive frame periods.

If a blanking period between adjacent frames is shorter with the exposure time shortened, the reading of the reset signal from the pixels at a row and the reading of the pixel signal from the pixels at another row during a preceding frame period may overlap the reading of the reset signal from the pixels at another row during a subsequent frame period. In such a case, the reset signal at one row of the pixels may possibly be difficult to read during either the preceding frame period or the subsequent frame period.

If the timing of reading of the reset signals from the pixels at two different rows and the reading of pixel signal from the pixels at another row are within the same 1 H period, the acquisition of the reset signal from the earlier frame period may be prioritized. In such a case, concerning the later frame period, the pixel signal read from the row having a signal read overlap time may be treated as invalid data. Alternatively, the reset level acquired from the earlier frame period may be used again during the later frame period. Conversely, if the acquisition of the reset signal from the later frame period is prioritized, the pixel signal read from a row having a signal read overlap time may be treated as invalid data or the reset level acquired from a frame period immediately prior to the earlier frame period may be used.

Figure 22:
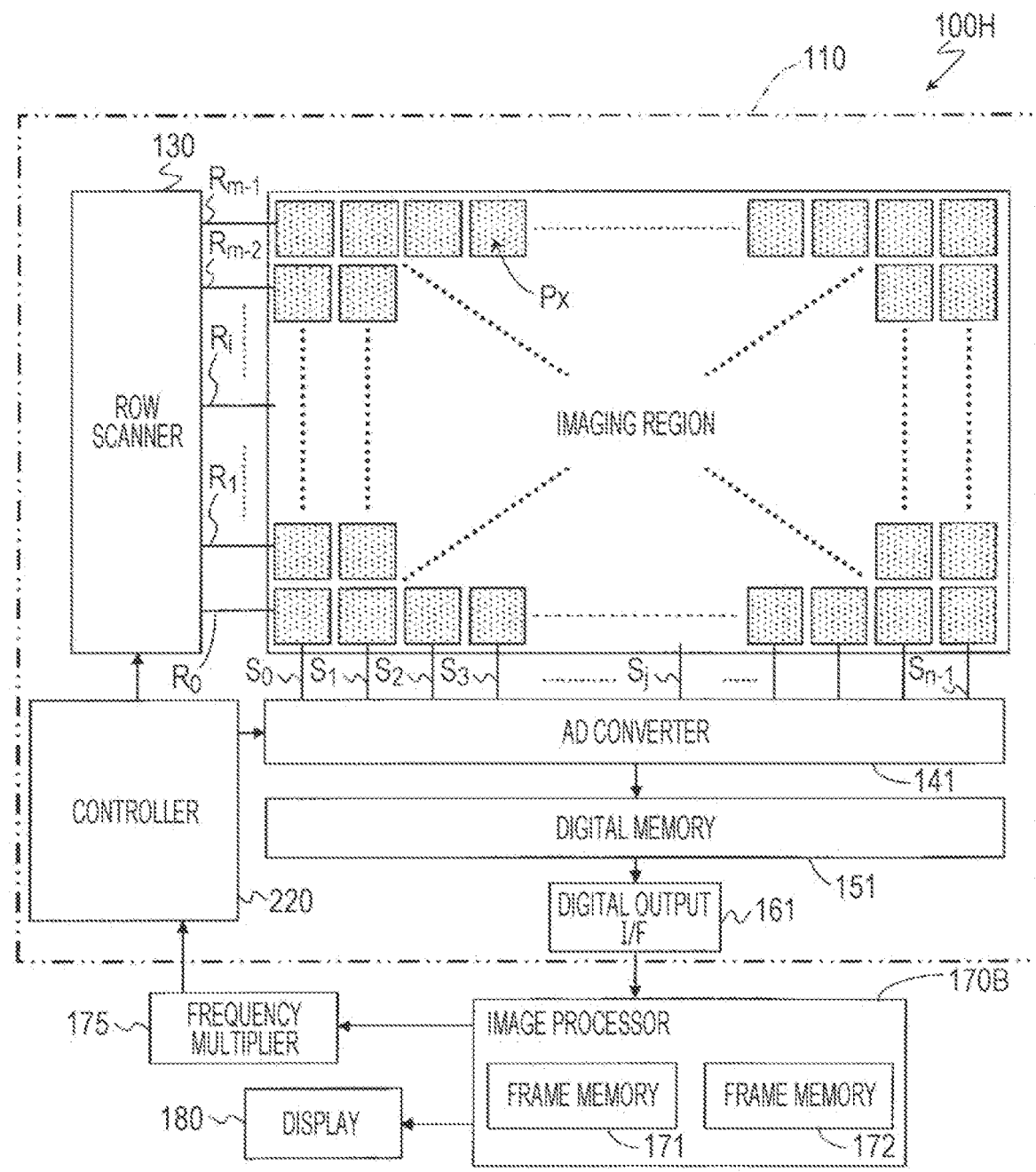
FIG. 22 schematically illustrates another modification of the imaging device.

In the connection configuration in FIG. 12, three or more output signal lines are arranged for each column of the pixels Px and these output signal lines are respectively connected to the AD converters. The analog signals may be read in parallel from the pixels at three or more rows. FIG. 22 schematically illustrates an exemplary signal reading operation in the configuration in which three or more AD converters are arranged for each column of the pixels Px. The exemplary operation illustrated in FIG. 22 may be performed by the imaging device having the two memory frames illustrated in FIG. 16 and having the connection configuration between the pixels and AD converters illustrated in FIG. 12.

Figure 21:
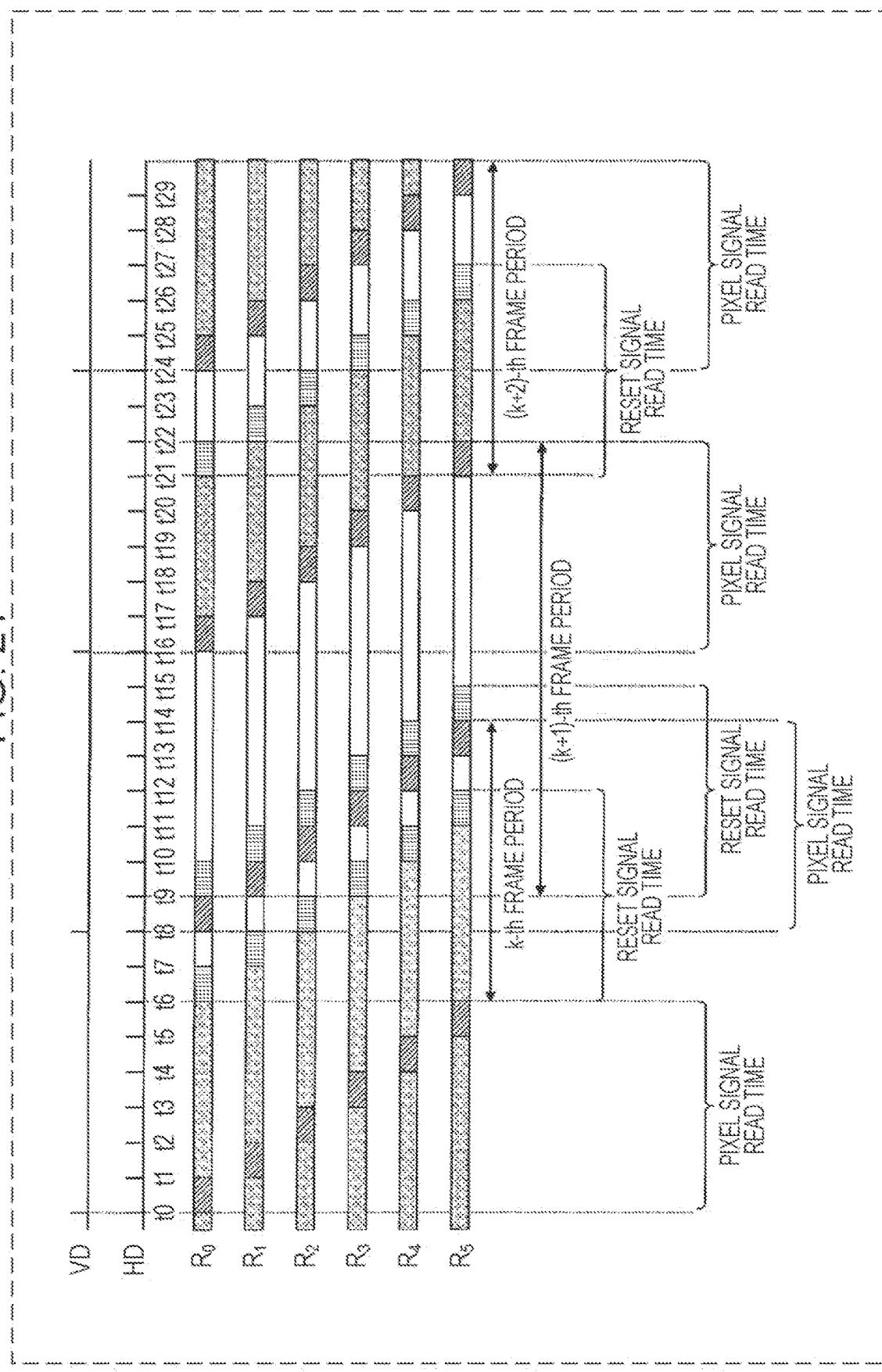
FIG. 21 schematically illustrates an example of a signal reading operation performed in the configuration in which three or more AD converters are arranged on a per column basis of multiple pixels.

Referring to FIG. 21, a portion of the k-th frame period overlaps a portion of the (k+1)-th frame period. During the 1 H period from time t9 to time t10 in FIG. 21, the reading of the reset signal from the pixels at the third row $R_3$ and the reading the pixel signal from the pixels at the first row $R_1$ during the k-th frame period overlaps the reading the reset signal from the pixels at the 0th row $R_0$ during the (k+1)-th frame period.

In the connection configuration in FIG. 12, the pixels at the 0th row $R_0$, pixels at the first row $R_1$, pixels at the second row $R_2$, and pixels at the third row $R_3$ are respectively connected to the first AD converter 141, second AD converter 142, third AD converter 143, and fourth AD converter 144 via the first output signal line $S_j$, second output signal line $T_j$, third output signal line $U_j$ and fourth output signal line $V_j$. In this connection configuration, via different output signals, the reading of the reset signal from the pixels at the third row $R_3$ and the pixel signal from pixels at the first row $R_1$ during the k-th frame period may be performed in parallel with the reading of the reset signal from the pixels at the 0th row $R_0$ during the (k+1)-th frame period. In other words, the analog signals are read in parallel from three or more rows of the pixels.

The analog signals individually read via the first output signal line $S_j$, second output signal line $T_j$, and fourth output signal line $V_j$ are respectively AD-converted into digital signals by the first AD converter 141, second AD converter 142, and fourth AD converter 144, respectively. Out of the digital signals obtained via the AD conversion, the first digital signal responsive to the reset signal is stored on the first frame memory 171 and the second digital signal responsive to the pixel signal is stored on the second frame memory 172. As described with reference to FIGS. 18 and 19, the first digital signal and second digital signal are sorted for storage by connecting the data selector 35 at a front stage to the first frame memory 171 and second frame memory 172.

Other Modifications

FIG. 22 schematically illustrates an imaging device 100H as another modification of the imaging device. Like the imaging device 100D described with reference to FIG. 16, the imaging device 100H in FIG. 22 includes the image processor 170B and a frequency multiplier 175 connected to the image processor 170B. In comparison with the imaging device 100D illustrated in FIG. 16, the imaging device 100H does not include the second output signal lines $T_j$, second AD converter 142, and second digital I/F 162. The image processor 170A may be used instead of the image processor 170B.

As schematically illustrated in FIG. 22, the imaging device 100H includes multiple first output signal lines $S_j$ arranged for multiple pixels Px. Each of the first output signal lines $S_j$ is connected to two or more reading circuits 20 belonging to the same column of the imaging region. Like the imaging devices described heretofore, the first output signal lines $S_j$ are connected to the first AD converter 141.

In response to a horizontal synchronization signal from the image processor 170B, the frequency multiplier 175 generates a pulse train having a period shorter than the horizontal synchronization signal. The pulse train has the period that is determined by equally dividing the pulse interval of the horizontal synchronization signal and is sent to the controller 220 from the frequency multiplier 175. The frequency multiplier 175 is typically a circuit that performs frequency multiplication using phase-locked loop (PLL). The frequency multiplier 175 may be part of the image processor 170A or part of the image processor 170B or part of the row scanner 130.

Figure 23:
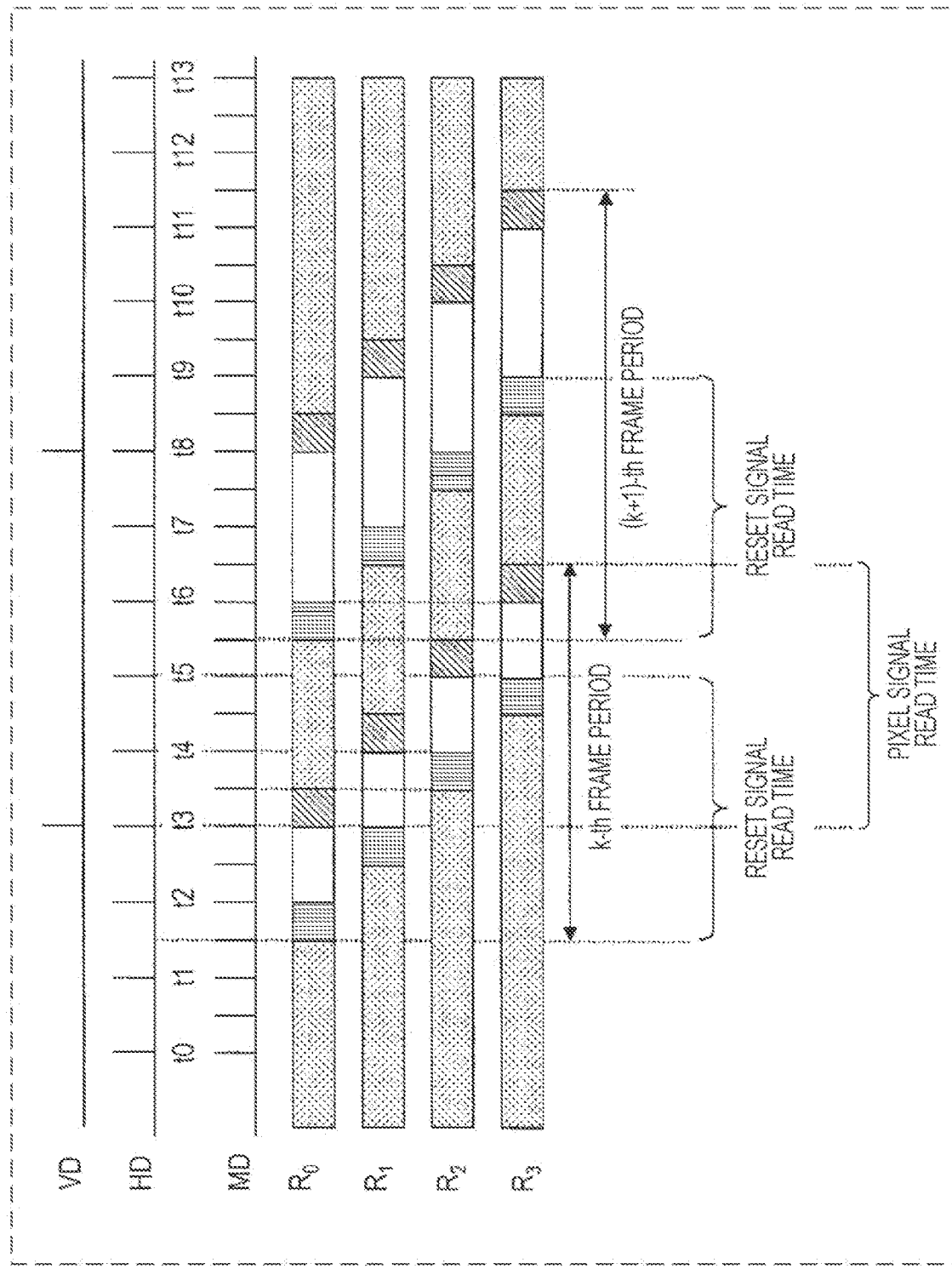
FIG. 23 schematically illustrates an operation example of the imaging device illustrated in FIG. 22.

FIG. 23 schematically illustrates an exemplary operation of the imaging device 100H in FIG. 22. A third chart from top in FIG. 23 schematically illustrates pulses of a signal MD output from the frequency multiplier 175. The pulses of the signal MD has a period half (½) as long as the horizontal synchronization signal HD.

Referring to k-th frame period in FIG. 23, a portion of the read time of the reset signal overlaps a portion of the read time of the pixel signal. From time t3 to time t4, the reading of the pixel signal from the pixels at the 0th row $R_0$ is performed during a first half of the 1 H period and the reading of the reset signal from the pixels at the second row $R_2$ is performed during a second half of the 1H period. In other word, the reading of the pixel signal from the pixels at one column and the reset signal from the pixels at another column belonging to the same column of the pixels Px is performed within the same 1 H period.

The reset signal and pixel signal thus read are respectively converted into the first digital signal and second digital signal by the first AD converter 141. At least the first digital signal out of the digital signals is stored on the first frame memory 171. The second digital signal may be stored on the second frame memory 172. After the completion of the reading of the pixel signal from all rows, the image processor 170B outputs, for each pixel, a difference between the second digital signal and the first digital signal stored on the first frame memory 171. This difference determination operation may practically cancel the effect of reset noise superimposed on these signals.

As described above, the signal MD as the second pulse train higher in frequency than the pulses of the horizontal synchronization signal HD may be generated and the reading of the analog signal from the pixels may be performed in response to the second pulse train. The reading of the analog signal is performed at time intervals shorter than the period of the pulses of the horizontal synchronization signal HD. Without arranging two or more output signal lines for each of the columns of the pixels Px, the frame rate may be flexibly changed with the effect of the reset nose cancelled in the same way as described above.

Referring to FIG. 23, as understood from the 1 H period across time t6, the reading of the reset signal during one frame period may be performed before the reading of the pixel signal during a frame period immediately prior to the one frame period. With a simpler circuit configuration in this way, the frame rate may be shortened by shortening the blanking period between the two frame periods.

The imaging device 100H in FIG. 22 includes the image processor 170B including the first frame memory 171 and second frame memory 172. In this configuration, the data selector 35 may be inserted between the first digital I/F 161 and the image processor 170B. Alternatively, an interface selectively outputting the first digital signal and an interface selectively outputting the second digital signal may be arranged and the data selector 35 may be inserted between these interfaces and the first AD converter 141.

As described above, according to a typical embodiment of the disclosure, a set of a first output signal line $S_j$ and second output signal line $T_j$ is arranged for each of the columns of the pixels Px. Thus, the reading of the reset signal from the pixels at one row belong to a column and the reading of the pixel signal from the pixels at another row belonging to the same column may be performed in parallel. Since the first AD converter 141 and second AD converter 142 are arranged for each of the columns of the pixels Px, the reset signal and the pixel signal on a pixel within the imaging area may be successively AD-converted using the first AD converter 141 and/or the second AD converter 142. By storing the first digital signal responsive to the reset signal and calculating the difference between the first digital signal and the second digital signal responsive to the pixel signal, the frame rate may be shortened while the effect of the reset noise may be practically canceled.

FIGS. 1 and 16 illustrate the circuit configuration in which the row scanner 130, controller 220, first AD converter 141, second AD converter 142, first digital memory 151, second digital memory 152, first digital I/F 161 and second digital I/F 162 are formed in the semiconductor substrate 110 having the pixels Px. Specifically, the semiconductor substrate 110 having the pixels Px, row scanner 130, controller 220, first AD converter 141, second AD converter 142, first digital memory 151, second digital memory 152, first digital I/F 161 and second digital I/F 162 may be integrated into a package and the package may be supplied. Part or whole of these circuits may be formed with the semiconductor substrate 110 having the reading circuit 20 for each pixel Px. These circuits may be formed in the semiconductor substrate 110 by using the same process as the process for forming the reading circuit 20 for each pixel Px. For example, the controller 220 may be an integrated circuit formed in the semiconductor substrate 110. All these circuits may not necessarily be integrally formed in the semiconductor substrate 110 with each pixel Px. Part or whole of these circuits may be arranged on a substrate different from the semiconductor substrate 110 having each pixel Px.

The function of the controller 220 and the function of the image processors 170A or 170B may be implemented by using a combination of a general-purpose processing circuit and software or by using hardware specialized for the processing of these circuits. The controller 220 may be configured to receive from the image processor 170A or 170B settings for the exposure time responsive to process results of the image processor 170A or 170B and supply a drive signal responsive to the settings for the exposure time to the row scanner 130, first AD converter 141, and second AD converter 142.

Each of the image processor 170A and 170B may have the form of a chip or a package separate from the circuit group mounted in the semiconductor substrate 110 and may be mounted in the imaging device. These substrates including the semiconductor substrate 110 may be supplied in a laminated form. The first frame memory 171 and/or the second frame memory 172 may have the form of a chip or package separate from the image processor 170A or 170B and may be mounted in the imaging device. The image processor 170A or 170B may be mounted in the semiconductor substrate 110. The image processor 170A or 170B may be part of the controller 220. The image processor 170A or 170B or the controller 220 may be configured to perform distance calculation or wavelength information separation.

The imaging devices of the embodiments of the disclosure may be supplied in the form of a package that the semiconductor substrate 110 having the pixels Px formed therein and the image processor 170A or 170B are integrated into. The imaging devices of the embodiments of the disclosure may be arranged in the form of an image sensor chip or camera.

The embodiments of the disclosure may be applicable to camera systems or cameras including a digital still camera, digital video camera, medical camera, security camera, vehicle-mounted camera, distance measuring camera, microscope camera, camera for an unmanned aerial vehicle called a drone, and/or robot camera. The vehicle-mounted camera may be used as an input unit of a control device such that a vehicle safely runs. The vehicle-mounted camera may also be used to assist an operator to allow the vehicle to safely run.

What is claimed is:

1. An imaging device comprising:
pixels arranged at rows and columns;
a first analog-to-digital (AD) converter and a second AD converter, an analog signal read from each of the pixels being input into the first AD converter or the second AD converter, a digital signal corresponding to the analog signal being output from the first AD converter or the second AD converter into which the analog signal is input;
pairs of a first output signal line coupled to two or more pixels and a second output signal line coupled to two or more pixels, respectively, each of the pairs being arranged for corresponding one of the columns, wherein the analog signal is transmitted through the first output signal line or the second output signal line;
a first frame memory; and
an image processor, wherein:
the analog signal includes a reset signal representing a reset level or a pixel signal representing an image of a subject,
the first frame memory temporarily stores a first digital signal output from the first AD converter or the second AD converter, the first digital signal corresponding to the reset signal from one of the pixels,
the image processor outputs a difference between a second digital signal output from the first AD converter or the second AD converter and the first digital signal stored on the first frame memory, the second digital signal corresponding to the pixel signal from the one of the pixels,
the first output signal line is coupled to the first AD converter but not coupled to the second AD converter, and
the second output signal line is coupled to the second AD converter but not coupled to the first AD converter.

2. The imaging device according to claim 1, wherein:
the first AD converter receives the reset signal and converts the reset signal into the first digital signal, and
the second AD converter receives the pixel signal and converts the pixel signal into the second digital signal.

3. The imaging device according to claim 2, wherein:
the first output signal line is connected to the first AD converter, and the second output signal line is connected to the second AD converter,
the imaging device further comprises a first signal switching circuit, the first signal switching circuit being connected between each of the pixels and corresponding one pair of the pairs of the first output signal line and the second output signal line, and
the first signal switching circuit outputs the reset signal from each of the pixels to the first output signal line and the pixel signal from each of the pixels to the second output signal line.

4. The imaging device according to claim 2, wherein a timing at which the first digital signal is output from the first AD converter matches a timing at which the second digital signal is output from the second AD converter.

5. The imaging device according to claim 1, wherein:
the pixels include a first pixel and a second pixel that are arranged at different rows,
the first pixel is connected to the first AD converter via the first output signal line and the second pixel is connected to the second AD converter via the second output signal line,
the first AD converter generates a digital signal corresponding to an analog signal read from the first pixel, and
the second AD converter generates a digital signal corresponding to an analog signal read from the second pixel.

6. The imaging device according to claim 5, wherein a timing at which the first digital signal is output from the first AD converter matches a timing at which the second digital signal is output from the second AD converter.

7. The imaging device according to claim 1, wherein:
the pixels include a first pixel and a second pixel that are arranged at different rows,
the first pixel is connected to the first output signal line and the second pixel is connected to the second output signal line, and
the first pixel is arranged at an even row of the rows and the second pixel is arranged at an odd row of the rows.

8. The imaging device according to claim 1, wherein each of the pixels comprises:
a semiconductor substrate having a reading circuit electrically connected to one or both of the first AD converter and the second AD converter; and
a photoelectric converter located on or above the semiconductor substrate.

9. The imaging device according to claim 1, wherein the first output signal line and the second output signal limes are coupled to each of the pixels arranged for a corresponding one of the columns, respectively.

10. An imaging device comprising:
pixels arranged at rows and columns;
a first analog-to-digital (AD) converter and a second AD converter, an analog signal read from each of the pixels being input into the first AD converter or the second AD converter, a digital signal corresponding to the analog signal being output from the first AD converter or the second AD converter into which the analog signal is input;
pairs of a first output signal line coupled to two or more pixels and a second output signal line coupled to two or more pixels, respectively, each of the pairs being arranged for corresponding one of the columns, wherein the analog signal is transmitted through the first output signal line or the second output signal line;
a first frame memory;
a second frame memory; and
an image processor, wherein:
the analog signal includes a reset signal representing a reset level or a pixel signal representing an image of a subject,
the first frame memory temporarily stores a first digital signal output from the first AD converter or the second AD converter, the first digital signal corresponding to the reset signal from one of the pixels,
the second frame memory temporarily stores a second digital signal output from the first AD converter or the second AD converter, the second digital signal corresponding to the pixel signal from the one of the pixels, and
the image processor outputs a difference between the first digital signal stored on the first frame memory and the second digital signal stored on the second frame memory.

11. The imaging device according to claim 10, further comprising a third signal switching circuit connected between the first and second AD converters and the first and second frame memories,
wherein the third signal switching circuit selectively outputs the first digital signal to the first frame memory and the second digital signal to the second frame memory.

12. A driving method of an imaging device including pixels arranged at rows and columns, each of the pixels including a photoelectric converter and a charge accumulation region, the driving method comprising:
(a) resetting a potential of the charge accumulation region;
(b) reading a reset signal corresponding to the potential of the charge accumulation region after the (a);
(c) generating a first digital signal corresponding to the reset signal via analog-to-digital (AD) conversion;
(d) storing the first digital signal on a first frame memory;
(e) accumulating, in the charge accumulation region, signal charges generated by the photoelectric converter after the (a);
(f) reading a pixel signal corresponding to an amount of the signal charges accumulated in the charge accumulation region in the (e);
(g) generating a second digital signal corresponding to the pixel signal via AD conversion; and
(h) acquiring a difference between the first digital signal and the second digital signal,
wherein a period of the (b) for a first pixel out of the pixels at least partially overlaps a period of the (f) for a second pixel different from the first pixel out of the pixels, the first pixel and the second pixel being arranged at different rows and at a same column.

* * * * *